United States Patent [19]

Fix, Jr.

[11] Patent Number: 5,699,952
[45] Date of Patent: Dec. 23, 1997

[54] AUTOMATED FUSION BONDING APPARATUS

[75] Inventor: John William Fix, Jr., Palm City, Fla.

[73] Assignee: The Fusion Bonding Corporation, Palm City, Fla.

[21] Appl. No.: 470,257

[22] Filed: Jun. 6, 1995

[51] Int. Cl.⁶ .................................................. B23K 20/12
[52] U.S. Cl. .......................... 228/102; 228/2.3; 228/9; 228/114.5; 156/73.5
[58] Field of Search ............................. 228/2.3, 114.5, 228/9, 102; 156/73.5

[56] References Cited

U.S. PATENT DOCUMENTS

| | | |
|---|---|---|
| 3,349,982 | 10/1967 | Lipp et al. . |
| 3,420,428 | 1/1969 | Maurya et al. . |
| 3,439,853 | 4/1969 | Deemie et al. . |
| 3,444,611 | 5/1969 | Bogart . |
| 3,451,608 | 6/1969 | Deemie et al. . |
| 3,452,914 | 7/1969 | Oberle et al. . |
| 3,460,734 | 8/1969 | Vill et al. . |
| 3,478,410 | 11/1969 | Maurya et al. . |
| 3,504,425 | 4/1970 | Sutovsky et al. . |
| 3,516,591 | 6/1970 | Gage . |
| 3,536,242 | 10/1970 | Gordon, Jr. et al. . |
| 3,537,172 | 11/1970 | Vozneseksky et al. . |
| 3,538,592 | 11/1970 | Padilla . |
| 3,542,274 | 11/1970 | Miller . |
| 3,542,275 | 11/1970 | Loyd et al. . |
| 3,545,071 | 12/1970 | Loyd et al. . |
| 3,547,741 | 12/1970 | Hewitt . |
| 3,548,487 | 12/1970 | Stamm . |
| 3,549,076 | 12/1970 | Mills . |
| 3,563,444 | 2/1971 | Loyd . |
| 3,564,703 | 2/1971 | Kiwalle . |
| 3,567,100 | 3/1971 | Farmer et al. . |
| 3,570,740 | 3/1971 | Stamm . |
| 3,575,334 | 4/1971 | Stamm . |
| 3,576,067 | 4/1971 | Loyd et al. . |
| 3,591,068 | 7/1971 | Farmer et al. . |
| 3,595,462 | 7/1971 | Hirayama . |
| 3,609,854 | 10/1971 | Hasui . |
| 3,612,386 | 10/1971 | Gibson et al. . |
| 3,613,982 | 10/1971 | Hollenberg et al. . |
| 3,613,983 | 10/1971 | Gage . |
| 3,616,980 | 11/1971 | Padilla . |
| 3,623,213 | 11/1971 | Sciaky et al. . |
| 3,623,214 | 11/1971 | Sciaky et al. . |
| 3,627,189 | 12/1971 | Ditto et al. . |
| 3,635,388 | 1/1972 | Jenkinson et al. . |
| 3,659,771 | 5/1972 | Kiwalle et al. . |
| 3,671,049 | 6/1972 | Stamm . |
| 3,678,566 | 7/1972 | Ellis et al. . |
| 3,680,760 | 8/1972 | Costa et al. ............... 228/2.3 |
| 3,691,622 | 9/1972 | Takagi et al. . |
| 3,694,896 | 10/1972 | Loyd . |
| 3,704,821 | 12/1972 | Loyd et al. . |

(List continued on next page.)

FOREIGN PATENT DOCUMENTS 63-140785  6/1988  Japan ........................... 228/9

OTHER PUBLICATIONS

*Welding Handbook*, Eighth Edition, vol. I, *Welding Technology*, American Welding Society, 1987, pp. 19–20, 41, 547–548.

*Welding Handbook*, Eighth Edition, vol. II, *Welding Processes*, American Welding Society, 1991, pp. 740–761.

*Primary Examiner*—P. Austin Bradley
*Assistant Examiner*—Jeffrey T. Knapp
*Attorney, Agent, or Firm*—Lott & Friedland

[57] ABSTRACT

A lightweight, portable automated fusion bonding apparatus consistently permits the accomplishment of fine grain, forged friction weld fusion bonding with the use of pressurized air sources commonly available at industrial facilities, automotive repair shops, and other manufacturing plants. The automated fusion bonding apparatus includes the following integrally coupled components: a drive-pressure mechanism, a passive fusion bonding mechanism, a stationary workpiece clamping mechanism, a rotatable workpiece and a stationary workpiece.

47 Claims, 19 Drawing Sheets

U.S. PATENT DOCUMENTS

| | | |
|---|---|---|
| 3,705,678 | 12/1972 | Searle . |
| 3,720,993 | 3/1973 | Farmer et al. . |
| 3,725,998 | 4/1973 | Searle . |
| 3,732,613 | 5/1973 | Steigerwald . |
| 3,735,910 | 5/1973 | Watson et al. . |
| 3,740,827 | 6/1973 | Hunter et al. . |
| 3,749,298 | 7/1973 | Hasui . |
| 3,750,927 | 8/1973 | Miller et al. . |
| 3,753,286 | 8/1973 | Lilly et al. . |
| 3,768,147 | 10/1973 | Berry et al. . |
| 3,772,765 | 11/1973 | Ditto . |
| 3,775,834 | 12/1973 | Ishikawa et al. . |
| 3,776,446 | 12/1973 | Gage et al. . |
| 3,777,360 | 12/1973 | Welch . |
| 3,777,967 | 12/1973 | Searle et al. . |
| 3,784,080 | 1/1974 | Ditto . |
| 3,804,318 | 4/1974 | Louw et al. . |
| 3,822,821 | 7/1974 | Clarke . |
| 3,827,138 | 8/1974 | Needham et al. . |
| 3,838,807 | 10/1974 | Nomura et al. . |
| 3,840,168 | 10/1974 | Searle et al. . |
| 3,848,793 | 11/1974 | Herman . |
| 3,853,258 | 12/1974 | Louw et al. . |
| 3,877,629 | 4/1975 | Louw et al. . |
| 3,882,593 | 5/1975 | Lucas . |
| 3,897,896 | 8/1975 | Louw et al. . |
| 3,902,504 | 9/1975 | Owens, Jr. et al. . |
| 3,954,215 | 5/1976 | Takagi et al. . |
| 3,972,465 | 8/1976 | Takaoka et al. . |
| 3,973,715 | 8/1976 | Rust . |
| 3,998,373 | 12/1976 | Jones et al. . |
| 4,030,658 | 6/1977 | Parrish . |
| 4,033,501 | 7/1977 | Ambrose, Jr. et al. . |
| 4,043,496 | 8/1977 | Jones . |
| 4,043,497 | 8/1977 | Jones . |
| 4,058,421 | 11/1977 | Summo . |
| 4,063,676 | 12/1977 | Lilly . |
| 4,067,490 | 1/1978 | Jones et al. ............................ 228/102 |
| 4,087,036 | 5/1978 | Corbett et al. . |
| 4,093,501 | 6/1978 | Van Staveren . |
| 4,122,990 | 10/1978 | Tanaki et al. . |
| 4,132,340 | 1/1979 | Kulick . |
| 4,144,110 | 3/1979 | Luc . |
| 4,213,554 | 7/1980 | Sciaky . |
| 4,247,346 | 1/1981 | Maehara et al. . |
| 4,349,144 | 9/1982 | Stevenson et al. . |
| 4,352,711 | 10/1982 | Toth . |
| 4,362,261 | 12/1982 | Cook, Jr. . |
| 4,377,428 | 3/1983 | Toth . |
| 4,414,046 | 11/1983 | Palmer . |
| 4,440,338 | 4/1984 | Stevenson . |
| 4,552,609 | 11/1985 | Larsen . |
| 4,593,848 | 6/1986 | Hochbein . |
| 4,702,405 | 10/1987 | Thomson et al. . |
| 4,712,724 | 12/1987 | Lebedev et al. . |
| 4,715,523 | 12/1987 | Ledebev et al. . |
| 4,733,814 | 3/1988 | Penman . |
| 4,735,353 | 4/1988 | Thomson et al. . |
| 4,757,932 | 7/1988 | Benn et al. . |
| 4,811,887 | 3/1989 | King et al. . |
| 4,817,193 | 3/1989 | Matthew . |
| 4,850,772 | 7/1989 | Jenkins . |
| 4,858,815 | 8/1989 | Roberts et al. . |
| 4,905,883 | 3/1990 | Searle . |
| 4,936,502 | 6/1990 | Schlarb et al. . |
| 4,995,544 | 2/1991 | Searle . |
| 4,998,663 | 3/1991 | Cakmak et al. . |
| 5,035,411 | 7/1991 | Daines et al. . |
| 5,046,655 | 9/1991 | Ohashi et al. . |
| 5,054,980 | 10/1991 | Bidefeld . |
| 5,100,044 | 3/1992 | Searle . |
| 5,148,957 | 9/1992 | Searle . |
| 5,156,316 | 10/1992 | Nied et al. . |
| 5,248,077 | 9/1993 | Rhoades et al. . |
| 5,558,265 | 9/1996 | Fix, Jr. ............................ 228/2.3 |

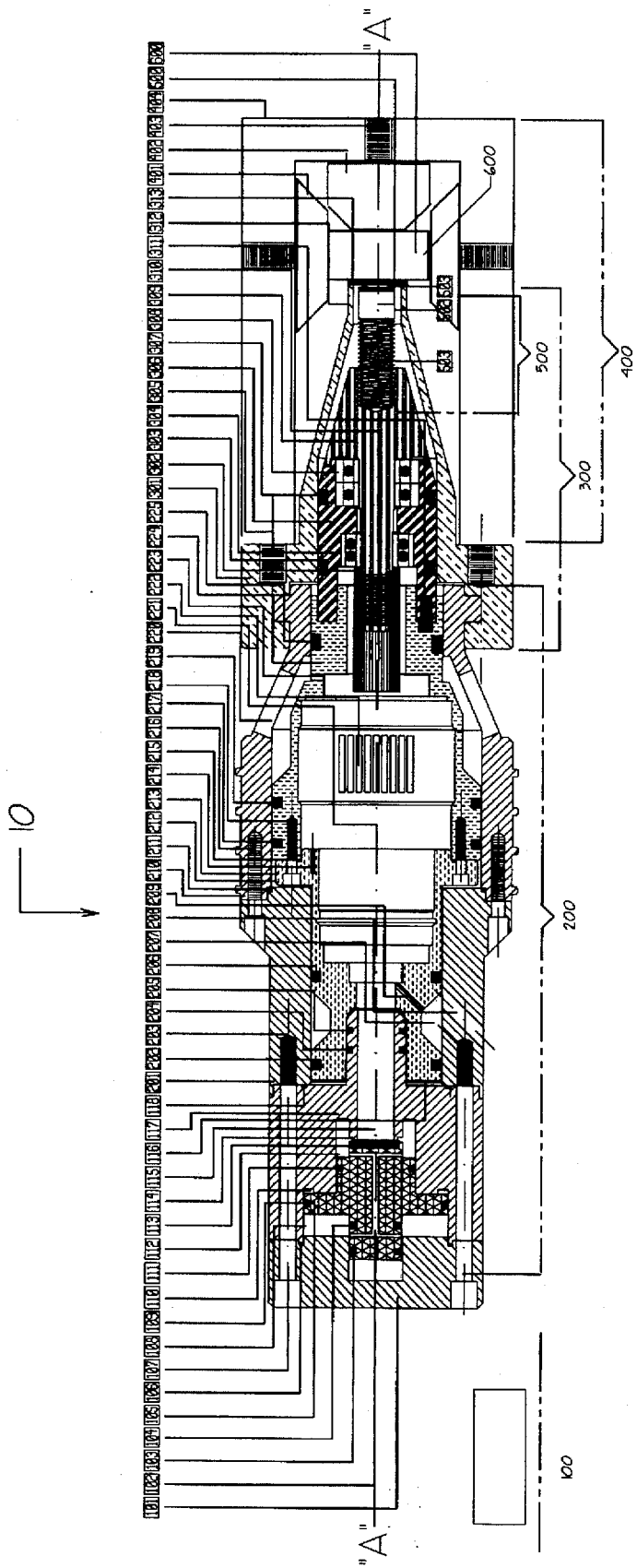

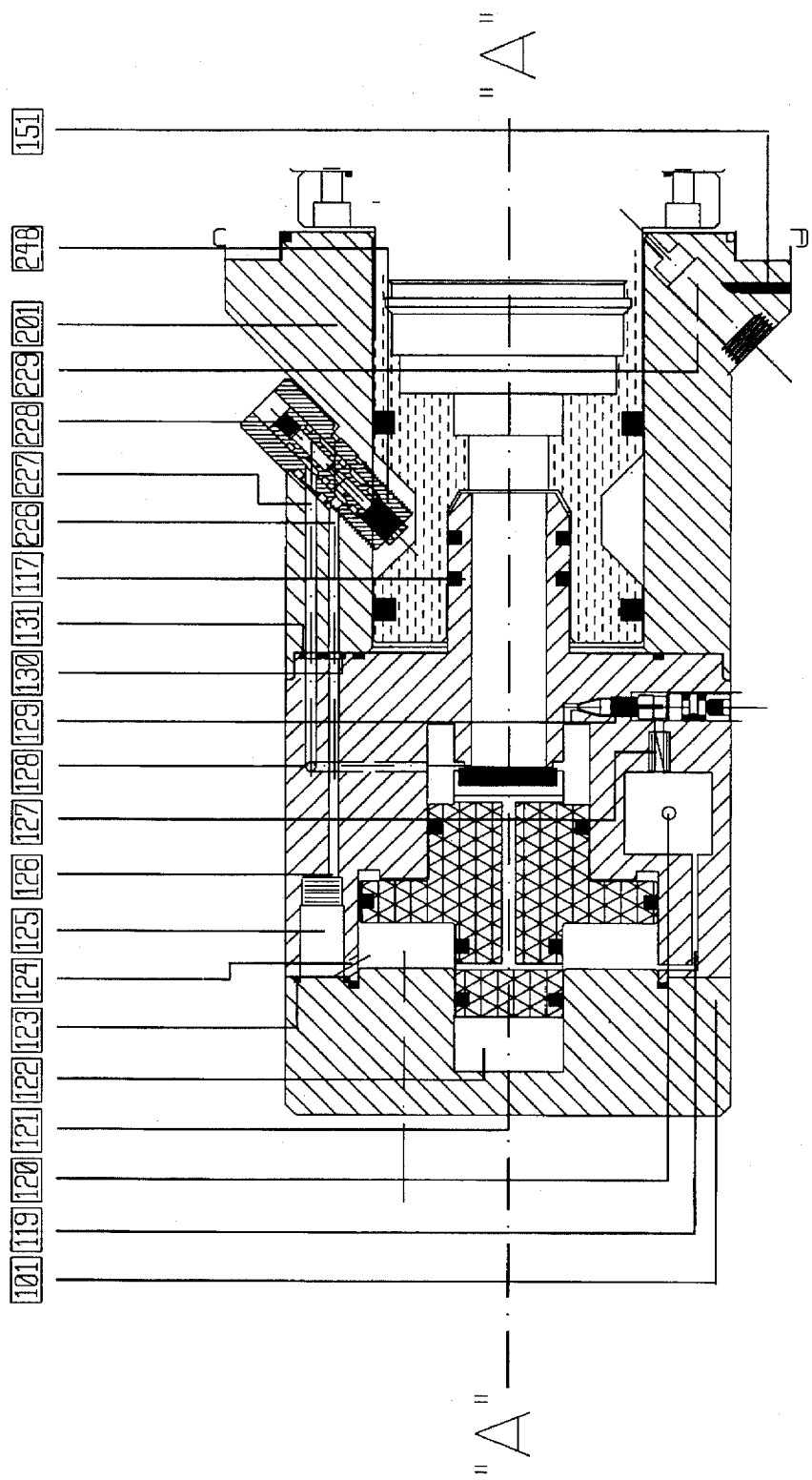
FIGURE - IE

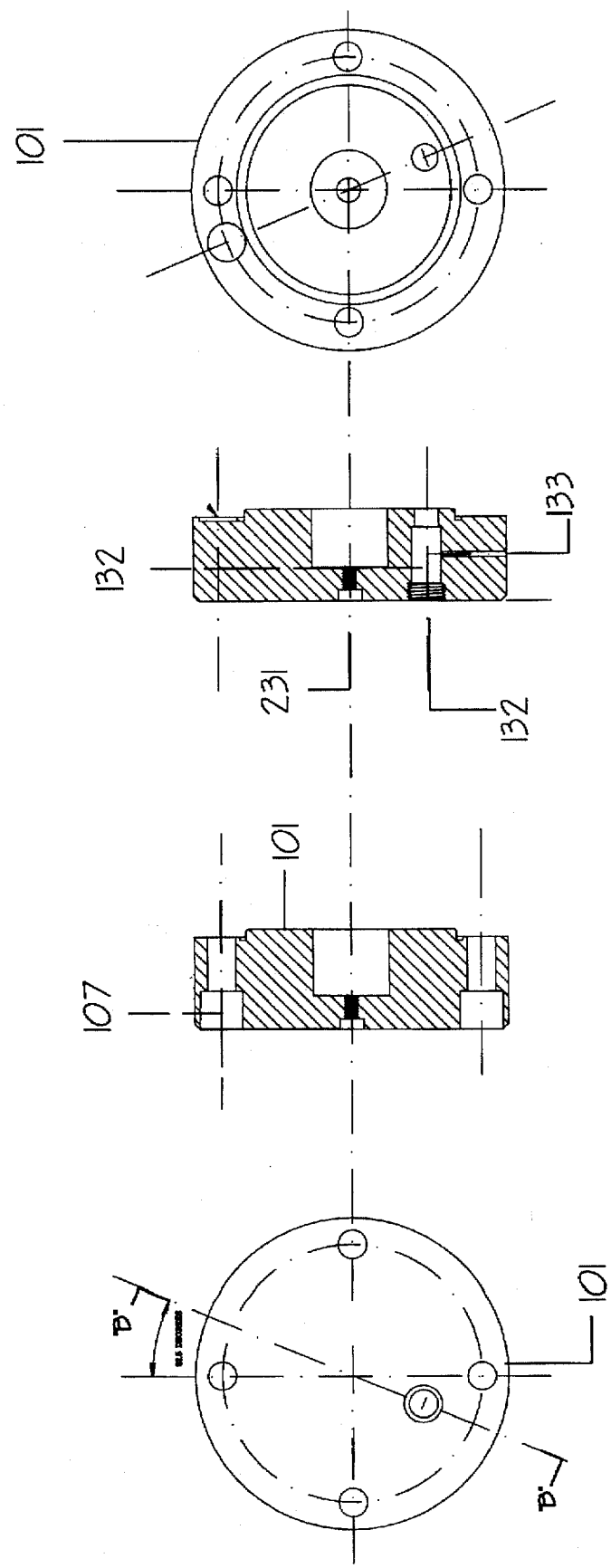

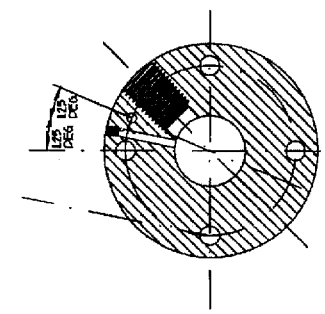
FIGURE 3F
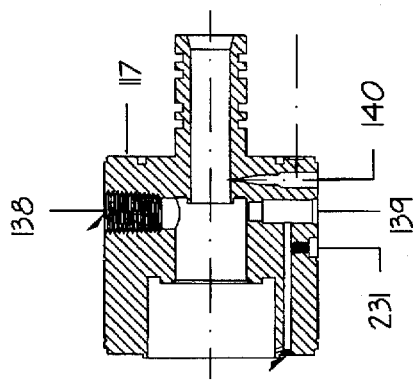
FIGURE 3E
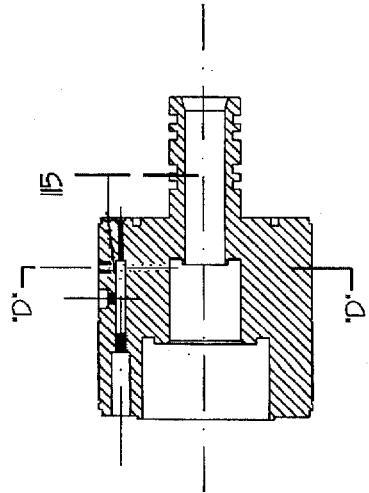
FIGURE 3B
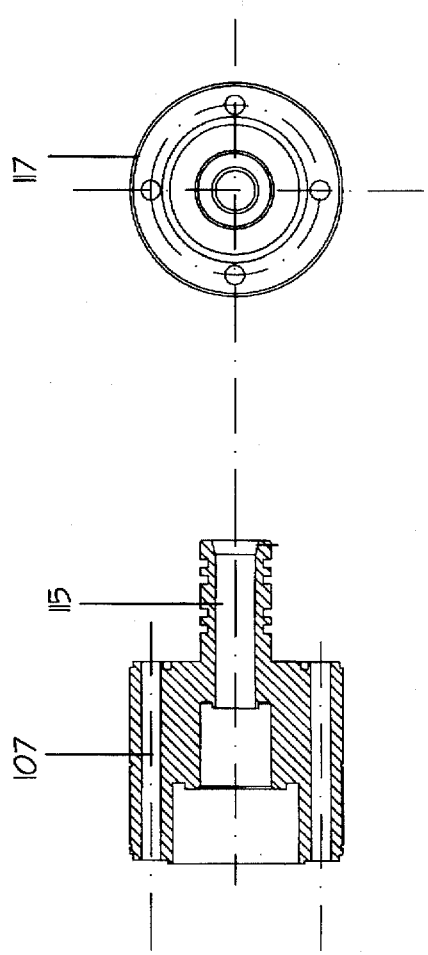
FIGURE 3D
FIGURE 3A
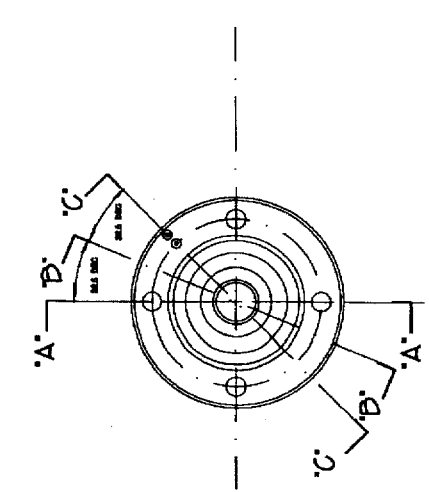
FIGURE 3C

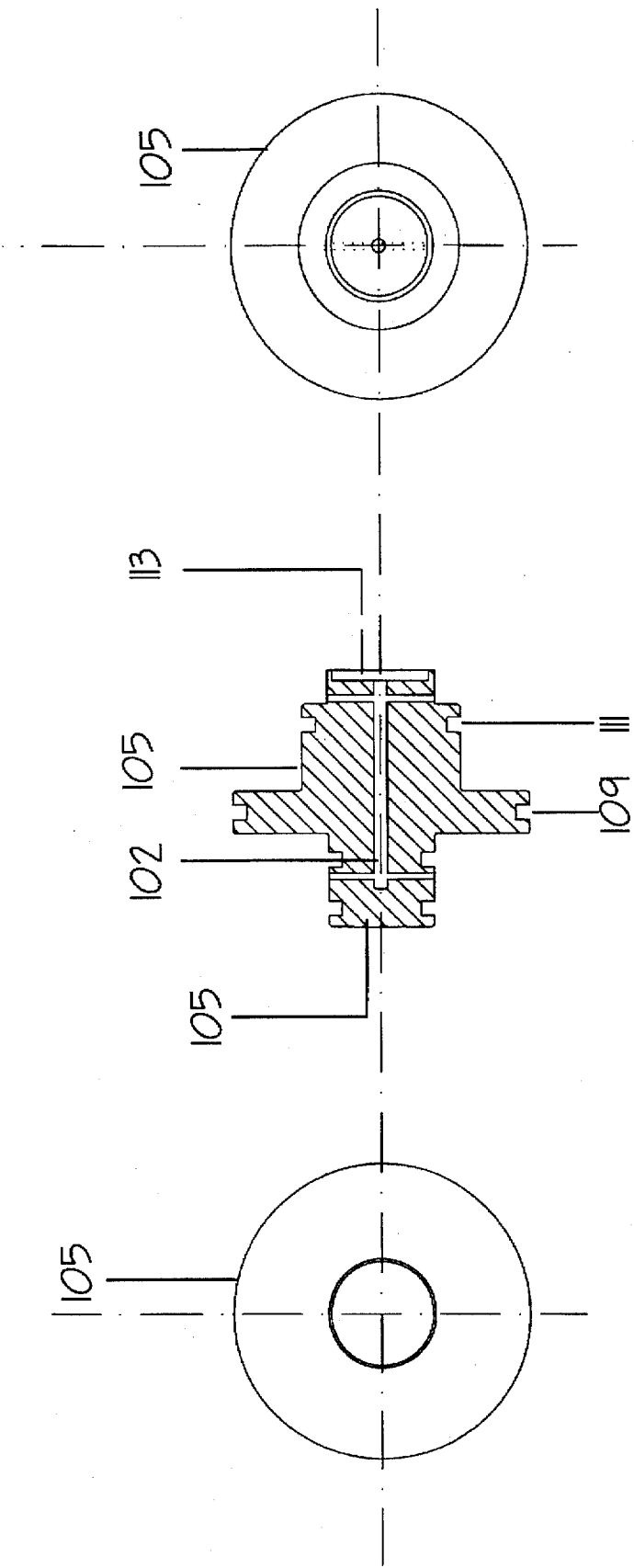

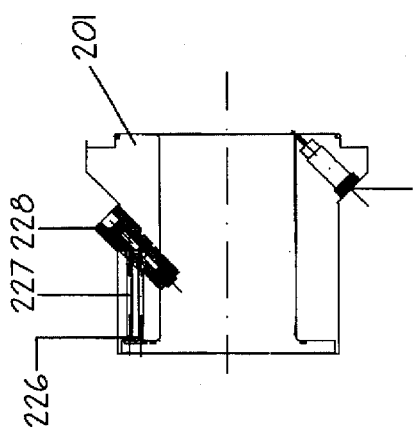
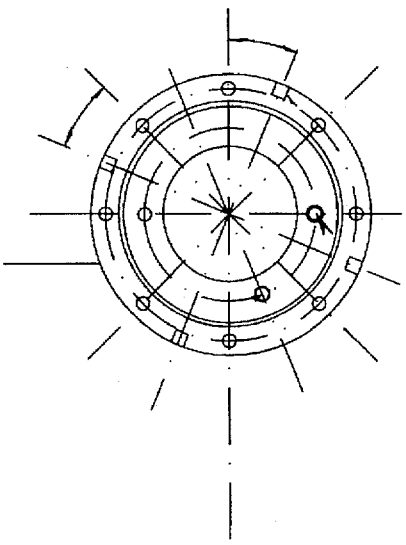
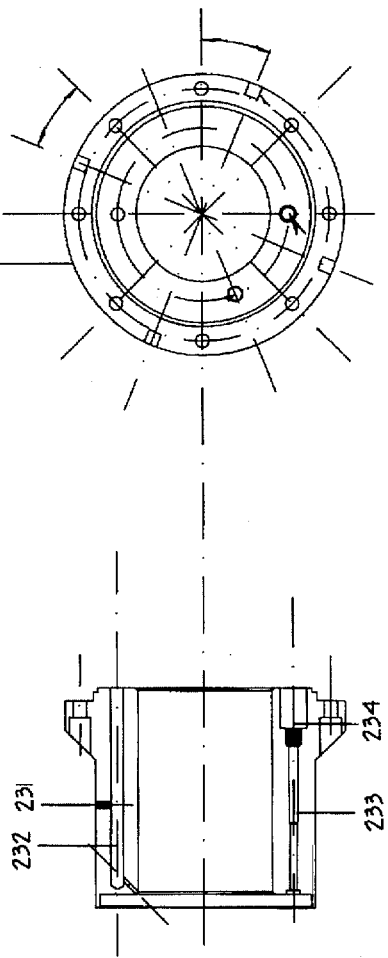
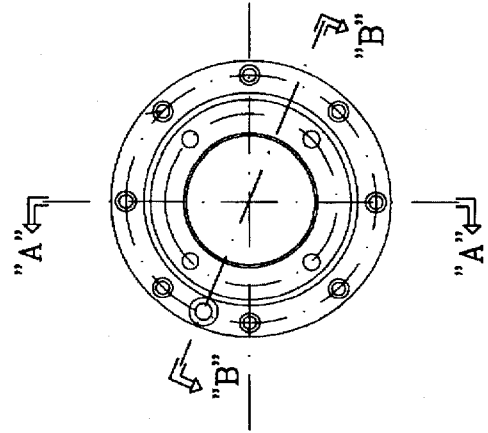

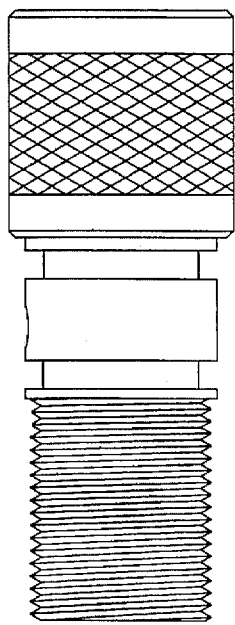
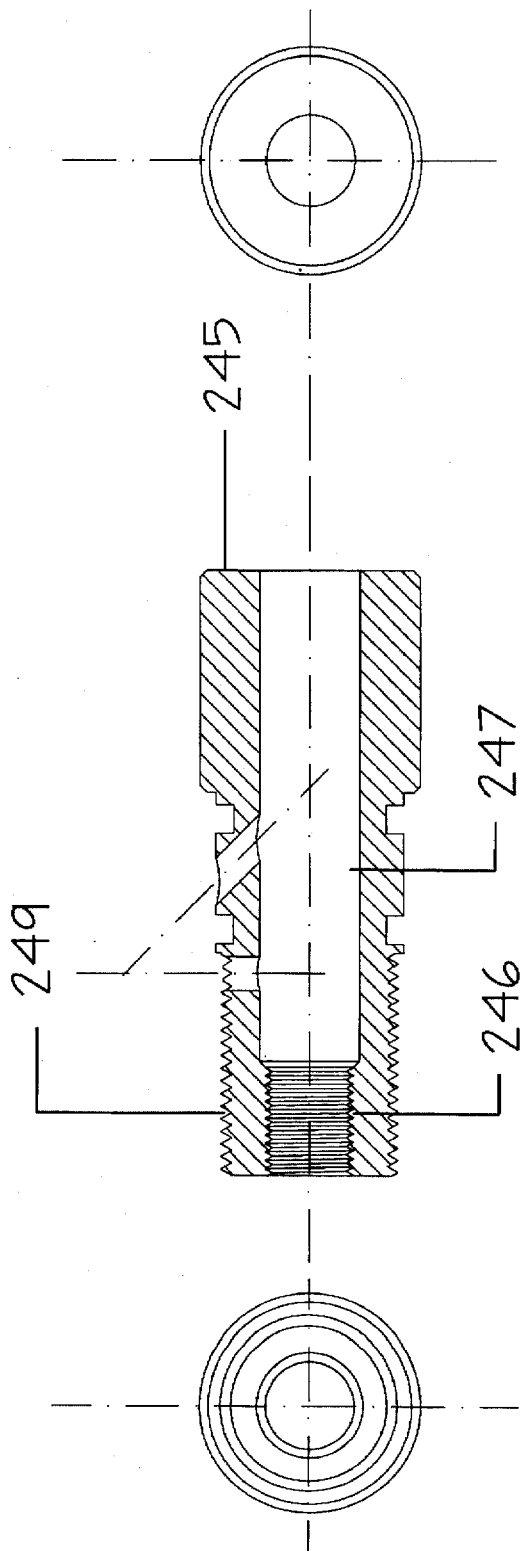
FIGURE 6A
FIGURE 6D
FIGURE 6B
FIGURE 6C

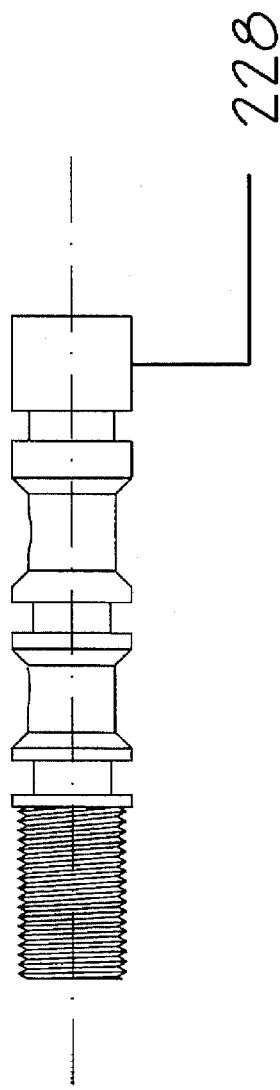
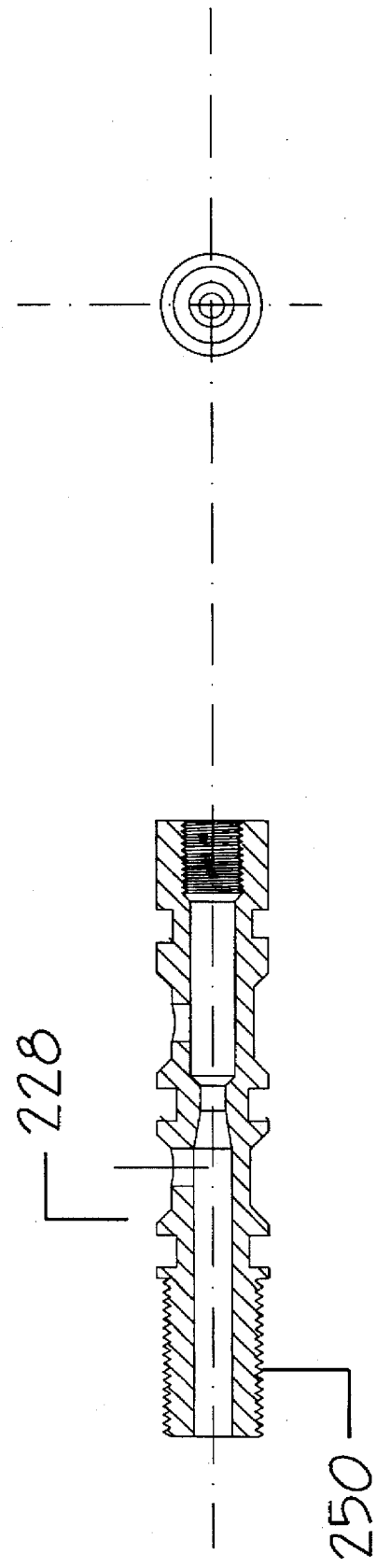
FIGURE 7C
FIGURE 7B
FIGURE 7A

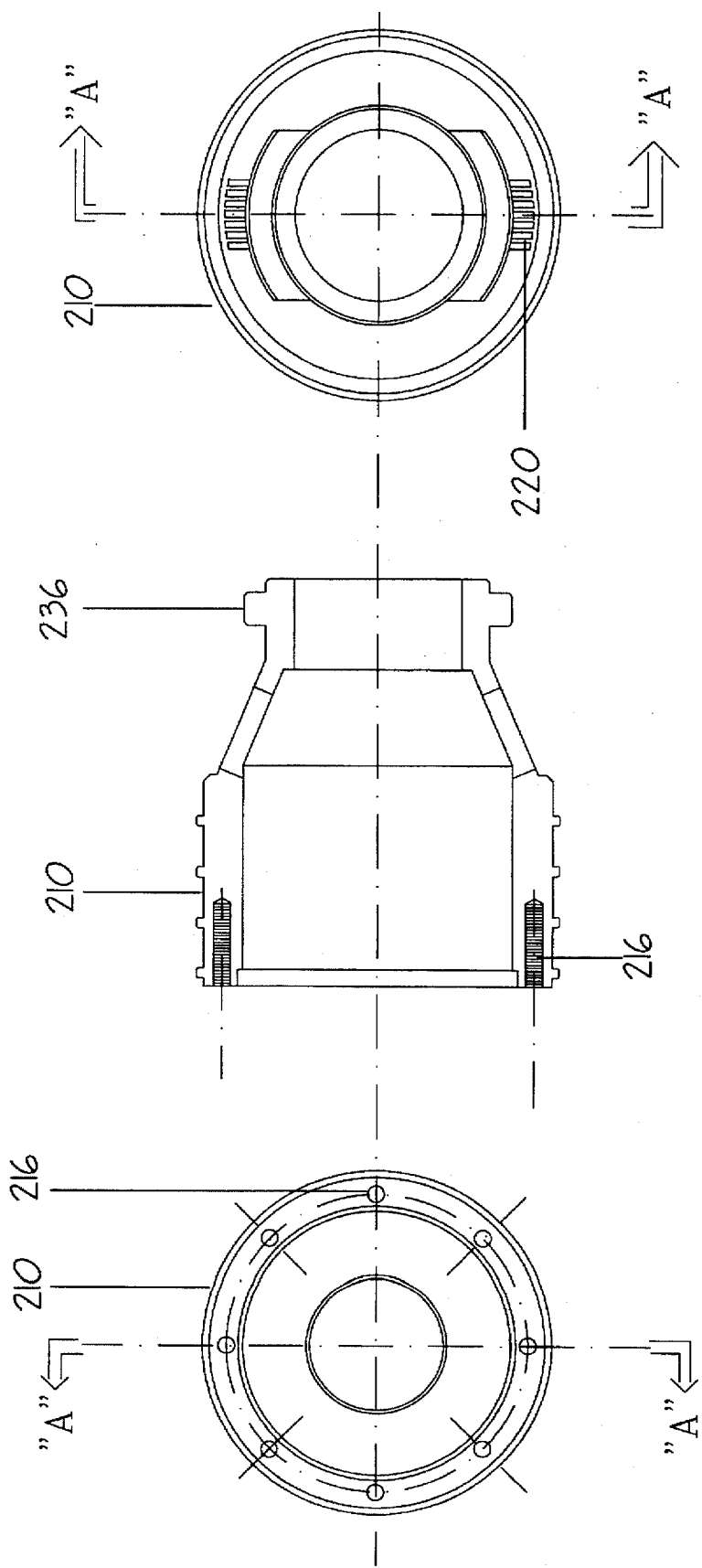

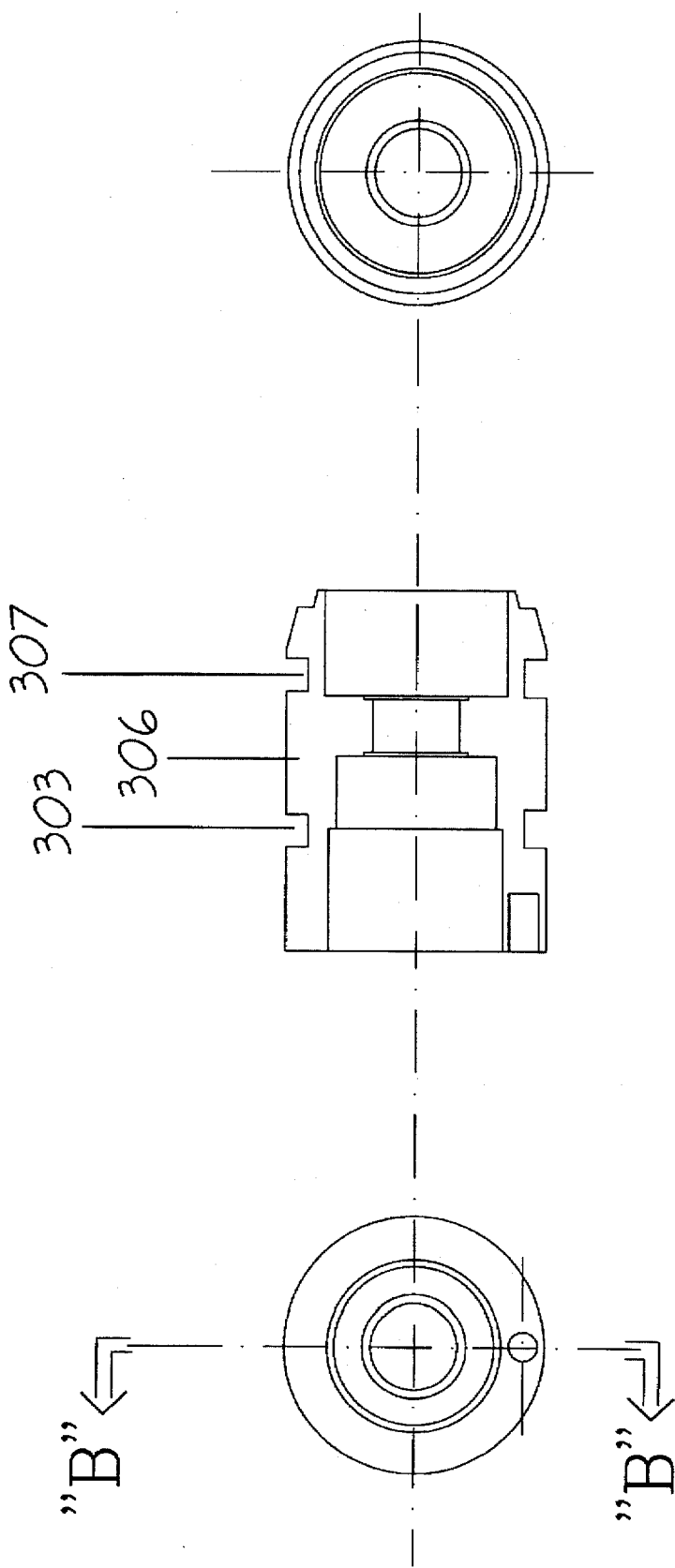

AUTOMATED FUSION BONDING APPARATUS

TECHNICAL FIELD

This invention relates generally to an apparatus and method for fusing various materials together, and this invention specifically relates to an automated portable friction welding fusion bonding apparatus, operable via low pressure air sources commonly found in industrial settings, and methods for its use.

BACKGROUND OF THE INVENTION

The joining of materials to form a strong cohesive, high strength, fine grain weld bond is common to industry throughout the world. It is commonly achieved by arc welding, oxyfule gas welding, flash welding, brazing, soldering, electron beam welding, laser beam welding and other techniques where open flame does not present an explosive hazard.

In most cases, the exposed flame or arc creates no hazard and is practical to use. In areas where combustible gases are present, it is not usually possible to use an open flame or arc welding procedure, due to the attendant danger of fire or explosion.

Another concern in the bonding of materials is material compatibility. Some materials, such as stainless steel, will not easily bond with aluminum alloys using the aforementioned welding processes.

One solution to the above-outlined problems is the friction weld procedure, which achieves a fusion bond. The friction welding fusion bonding process and its related processes rely on friction heat generation between surfaces to provide a material flux which may be forged to produce an integral bond between the surfaces. In the friction welding process, relative rotation between a pair of workpieces (i.e., the two pieces to be welded together, a rotatable workpiece and a stationary workpiece) is caused while the workpieces are urged together. Typically, once sufficient heat is built up at the interface between the workpieces, relative rotation is stopped and the workpieces are urged together under a forging force which may be the same as or greater than the original forging force.

The friction welding process has been utilized since the late 1950's. The original friction weld patent was granted to A. I. Chudikov, in 1956. The advantages of the friction welding process include, but are not limited to: (1) flux and shielding gas are not required; (2) in most cases, the weld strength is as strong as or stronger than the weaker of the two materials being joined; (3) surface cleanliness is not as significant, compared with other welding processes, since friction welding tends to disrupt and displace surface films; (4) there are narrow heat-affected zones; (5) the process is generally environmentally clean; (6) friction welding is suitable for welding most engineering materials and is well suited for joining many dissimilar metal combinations; (7) no filler metal is needed; (8) operators are not required to have manual welding skills; (9) the process is easily automated for mass production; and (10) welds are made rapidly compared to other welding processes.

Examples of friction welding processes are radial friction welding, orbital friction welding, angular reciprocating friction welding, linear reciprocating friction welding and friction surfacing.

However, there are generally two most commonly recognized methods of friction welding: direct drive friction welding, more commonly called conventional friction welding, which uses a continuous supply power input; and inertia friction welding, which uses a flywheel to store energy and later provides additional inertia force to complete the welding process. The friction welding fusion bonding process is achieved by a similar manner of the direct drive friction welding process, and relies on heat generation between rubbing surfaces to provide a material flux which may be forged to produce an integral bond between the two surfaces.

There are a number of problems in both conventional friction welding and inertia friction welding. In these processes, relative rotation between a pair of workpieces (i.e., the two pieces to be welded together) is caused while the workpieces are urged together. Once sufficient heat is built up at the interface between the workpieces to cause the materials to become plastic in physical nature, relative rotation is stopped and the workpieces are urged together under a forging force which may be the same as or greater than the original forging force. Both conventional and inertia friction welding apparatuses are typically large, heavy and include complex electronic controls for controlling (1) the different forces which must be applied; and (2) the drive means in a selective manner to control relative rotation of the workpieces.

There is a problem which occurs with conventional friction welding when the two workpieces are initially brought together. At this initial stage, there is significant initial friction between the workpieces and, therefore, a considerable increase in the energy required to overcome the initial friction. This problem is further complicated in welding rotatable workpieces to stationary workpieces due to wide variations in frictional torque throughout the weld cycle. On initial contact of the welding surfaces, there is a relatively high frictional torque which is shortly followed by a requirement for inertial energy, which persists until a flux of hot metal is established. However, this energy requirement is temporary and ceases after the resistive torque has been overcome. When the flux is established, the resistive torque falls to a level during the "burn-off" and "upset" phases, which may typically be as low as twenty-five percent of the initial peak torque. During this phase, axial pressure is maintained and the contact surface of both members are carbonized, when using carbon steel, thereby adding to the flux. This upset phase continues until the driving torque is removed, after which the flux cools, and until the weld fuses and the resistive torque starts to increase again causing the spinning process to cease.

The above-noted problems have been addressed, to some extent, by the development of drive motors capable of supplying sufficient torque to overcome initial friction forces. Such a drive motor is generally acceptable in relatively stationary friction welding apparatuses. However, the use of high power drive motors, due to their large power requirements and weight, are unacceptable for the design of a portable friction weld apparatus.

In conventional friction welding, the rotatable workpiece is attached to a motor driven unit and rotated at a predetermined, constant speed, while the other stationary workpiece is maintained in a fixed, stationary orientation. When the appropriate rotational speed is reached, the two workpieces are brought together and an axial force is applied. Heat is generated as a result of the friction generated by the interface of the respective surfaces, which continues for a predetermined time or until a preset amount of upset takes place. Thereafter, the rotational driving force is discontinued and the rotation of the rotatable workpiece is stopped. The axial force between the two members is maintained or increased, however, for a predetermined period of time to finalize the weld. The weld product resulting from a conventional friction weld process is characterized by a narrow heat affected zone and the presence of plastically deformed material around the weld.

A number of disadvantages exist with the conventional friction welding process. In addition to those previously mentioned, in rigorous applications such as those presented in the industrial environment, the required electronic controls are often prone to failure. Moreover, the presence of electronic controls requires the presence of an electrical power source, which is often unavailable or impractical in the industrial setting.

Inertia friction welding was developed to address the disadvantages of conventional friction welding techniques. With inertia friction welding, the speed of the rotating workpiece continuously decreases during the final friction stages of the procedure. Further, the rotating workpiece is coupled to a flywheel, which is accelerated to a predetermined rotational speed. During the weld process, the drive motor is disengaged and the workpieces are forced together in an axial direction. This axial force causes the forging surfaces to rub together under pressure. The kinetic energy stored in the rotating flywheel is ultimately dissipated as heat, as a result of friction between the workpieces. As a result of such friction, the speed of the flywheel decreases until stoppage, during which the axial force may be increased or maintained. The total time for the flywheel to come to rest depends on the average rate at which the energy is being removed and converted to heat.

As aforementioned, inertia friction welding is the most common technique because it has resolved some of the problems common to conventional friction welding. Three variables are presented by the inertia friction welding technique. These include the movement of inertia of the flywheel, the initial flywheel speed, and the axial pressure between the workpieces. The first two variables dictate the total amount of kinetic energy available to form the weld since the energy contained within a flywheel is determined by its mass and rotational speed. The required axial pressure is dictated by the materials to be welded and the interface area.

There have been attempts to develop a portable friction welder apparatus. Two inertia friction welding apparatuses are disclosed in U.S. Pat. Nos. 4,702,405 and 4,735,353, both to Thomson, et al. Both of these disclose use of a flywheel. The friction weld apparatuses described by Thomson are somewhat portable and utilize a dual drive means, where the second drive means includes a flywheel. In operation, the Thomson apparatuses utilize the first drives means to establish a preliminary number of revolutions per minute in the rotating workpiece before it is engaged to the stationary workpiece to which a weld is desired. Upon engagement, the spinning member begins to decelerate at a rate commensurate with the axial load and the initial revolutions per minute. Sufficient rotations of the spinning member, however, are maintained by the energy stored in the flywheel, which is hopefully sufficient to maintain rotational movement to overcome the initial frictional forces, whereafter the first drive means maintains rotation of the spinning member until the weld is completed.

However, there are disadvantages with the apparatuses described by Thomson. One disadvantage is the requirement for an extremely high pressure air source and high pressure fluid flow to power the apparatus. Accordingly, the Thomson apparatuses are not adapted to use pressurized air sources conventionally found at industrial facilities, but instead must utilize high pressure air supplied by special compressor units, which must necessarily accompany the apparatus to the job site. This need for an additional source of pressurized air decreases, to a considerable degree, the portability and flexibility of the Thomson systems and increases the costs of their operation. Moreover, the high pressure requirement increases the complexity of the architecture of the air motor and thus increases the overall maintenance requirements of the system.

Another disadvantage of the Thomson apparatuses is the requirement for a flywheel to store inertial energy, which also renders them heavy and bulky.

Yet another disadvantage of the Thomson apparatuses is that they may require more than one person to operate them, and these persons must be specially trained to operate them.

John Fix, the inventor of the present invention, invented a portable friction welder in early 1993. This friction welder can be effectively used at remote industrial plant locations to install injection fittings under specific guidelines, as well as in other industrial applications. A patent was applied for for this friction welder on Feb. 4, 1994, (Ser. No. 08/191,618) ("the '618"). Unlike the Thomson systems, the '618 friction welder apparatus relies on conventional friction welding as opposed to inertia friction welding. It is also not utilized in one housing with integrated architecture, but rather componentized with integration achieved with coupling elements. With the '618 apparatus, the welding process does not rely on timed control, but rather uses a sensing system with embedded fluid logic feedback lines to a remote control panel.

While the '618 apparatus offers many advantages over other systems, it has a number of limitations which have been addressed and overcome by the present invention. Some of the limitations of the '618 apparatus include, but are not limited to: (1) remote control panel operation is cumbersome with an umbilical cord and additional external feedback lines; (2) does not lend itself to specific scaling factors, and therefore cannot be miniaturized effectively to meet universal applications; (3) unable to adapt universally to many applications without making many different models; (4) programmable control limitations; (5) ease of use limitations; (6) field setup time constraints; (7) production costs are high; (8) unable to adapt to a wide variety of components to be welded to a workpiece; (9) uses many off-the-shelf components, which are not easily adaptable to changes; and (10) complex componentization.

Thus, there has been a need in the art for an automated fusion bonding apparatus with easily used integrated control operation.

There has been an additional need in the art for a portable automated fusion bonding apparatus which can be used in a variety of applications, so as to obviate the need for many different models.

There has also been a need in the art for an automated fusion bonding apparatus with expanded capabilities with respect to associated programmable controls.

There has been an additional need in the art to provide an automated fusion bonding apparatus which can be easily used by operators.

There has been a further need in the art for an automated fusion bonding apparatus which can be set up quickly at plants and in the field.

There has also been a need in the art for an automated fusion bonding apparatus which can be used without incurring high production costs.

There has been an additional need in the art for an automated fusion bonding apparatus which can be adapted for a variety of components to be welded to a workpiece.

There has been a further need in the art for an automated fusion bonding apparatus which can be used with a variety of components.

There has also been a need in the art for an automated fusion bonding apparatus which does not require complex componentization.

SUMMARY OF THE INVENTION

The present invention solves significant problems in the art by providing an automated fusion bonding apparatus and a method for its use. Generally described, the present invention provides for a lightweight, portable apparatus that consistently permits the accomplishment of fine grain, forged friction weld fusion bonding with the use of pressurized air sources commonly available at industrial facilities, automotive repair shops, and other manufacturing plants. The friction weld fusion bonding apparatus of the present invention generally includes a unique drive-pressure mechanism, a passive element component, a clamp assembly and a control means.

In a preferred embodiment, a portable friction welding apparatus for fusion bonding a rotatable workpiece to a stationary workpiece is provided, wherein the fusion bonding process comprises burn-off, upset, forging and fusion phases. The apparatus includes an integrated drive-pressure mechanism, including a drive-pressure mechanism external housing, a drive-pressure mechanism internal piston housing, a rotatable drive means and a rotatable drive means shaft in the drive-pressure mechanism internal piston housing. The drive-pressure mechanism internal piston housing includes an axially disposed shaft in the drive-pressure mechanism internal piston housing and an axial movement mechanism within the drive-pressure mechanism external housing to produce a selected axial force.

The apparatus also includes a passive fusion bonding mechanism slidably coupled to the integrated drive-pressure mechanism. The passive fusion bonding mechanism includes a passive fusion bonding mechanism external housing, a passive fusion bonding mechanism internal shaft-bearing housing, and a passive fusion bonding mechanism shaft. The passive fusion bonding mechanism internal shaft bearing housing is slidably disposed in the passive fusion bonding mechanism external housing. The passive fusion bonding mechanism shaft is slidably coupled to the rotatable drive means shaft, wherein the passive fusion bonding mechanism shaft holds the rotatable workpiece within the passive fusion bonding mechanism external housing and the passive fusion bonding mechanism shaft rotates the rotatable workpiece in an axial direction toward the stationary workpiece. The passive fusion bonding mechanism shaft concurrently translates rotational motion to the rotatable workpiece for the phases.

The apparatus also includes an engagement mechanism coupled to the drive-pressure mechanism and the passive fusion bonding mechanism to translate rotatable motion and axial movement forces to the passive fusion bonding mechanism shaft, thereby rotating the rotatable workpiece toward the stationary workpiece for the phases. The apparatus further includes a control system for controlling the fusion bonding process.

In one aspect of the preferred embodiment of the invention the control system is programmable. In other aspects of the invention, the engagement means includes a spline coupled to the passive fusion bonding mechanism shaft. The drive-pressure mechanism internal piston housing includes a programmable rotational speed means. The control system is operably engaged to a power source control piston valve means slidably disposed within the drive-pressure mechanism external housing, wherein the power source control piston valve means supplies fluid flow to the drive-pressure mechanism.

In other aspects the apparatus further includes a support means removeably engageable to the passive fusion bonding mechanism external housing which is adapted to hold the stationary workpiece in a fixed axial relationship relative to the rotatable workpiece. The support means includes a workpiece clamping bracket releasably coupled to the passive fusion bonding mechanism external housing; a plurality of threaded fasteners attached to the workpiece clamping bracket; and one or more adjustable arms which float on the threaded fasteners, the arms including a plurality of independent linear and perpendicular geometrically shaped moveable attachment elements to position the stationary workpiece in a fixed, spaced relationship relative to the rotatable workpiece. The workpiece clamping bracket is releasably coupled to the passive fusion bonding mechanism by a twist-locking means.

In other aspects, the drive-pressure mechanism external housing further includes one or more pressurizable chambers defined within the drive-pressure mechanism external housing, wherein the pressurizable chambers are in fluid communication with a source of pressurized fluid. The apparatus also has pressure seals disposed externally on the drive-pressure mechanism internal piston housing to prevent fluid pressure from escaping the drive-pressure mechanism pressurizable chambers during the forging phase.

In still other aspects, the drive-pressure mechanism internal piston housing is slidably and axially disposed within the drive-pressure mechanism external housing. The introduction of fluid in the pressurizable chambers results in axial movement of the drive-pressure mechanism internal piston housing, thereby driving the drive-pressure mechanism internal piston housing toward the passive fusion bonding mechanism internal shaft bearing housing at a preprogrammable selected axial force level, which is increasing. The apparatus further has fluid pressure monitoring ports operatively disposed within the drive-pressure mechanism external housing.

In yet other aspects, the drive-pressure mechanism internal piston housing includes an urging plate disposed within the drive-pressure mechanism internal piston housing. The drive-pressure mechanism is coupled to the passive fusion bonding mechanism in a twist-locked fashion and the rotatable drive means causes the passive fusion bonding mechanism shaft to rotate the rotatable workpiece as the rotatable workpiece is urged forward toward the stationary workpiece. The urging plate forces the passive fusion bonding mechanism internal shaft bearing housing toward the stationary workpiece for the fusion bonding process.

In other aspects, the drive-pressure mechanism external housing is axially and slidably coupled to the passive fusion bonding mechanism external housing by a quick disconnect assembly. The apparatus may further include a shaft coupling element, the shaft coupling element having two ends, wherein one of the ends is threadedly coupled to the passive fusion bonding mechanism shaft and the other of the ends is slidably coupled to the rotatable drive means shaft.

In still other aspects, the passive fusion bonding mechanism further includes a detachable encapsulation chamber disposed about the terminal end of the passive fusion bonding mechanism external housing and the rotatable workpiece. The apparatus further includes means for maintaining a positive pressure in the detachable encapsulation chamber during the fusion weld process. The detachable encapsulation chamber includes a pliable gasket placed in spaced relation between the passive fusion bonding mechanism external housing and the stationary workpiece.

In yet another aspect, the drive-pressure mechanism internal piston housing includes an internal anti-rotational means.

In another preferred embodiment of the invention, a portable welding apparatus for fusion bonding a rotatable workpiece to a stationary workpiece is provided, wherein the fusion bonding process includes burn-off, upset, forging and fusion phases. The apparatus includes: (1) a programmable control system for controlling the operation of the apparatus including control flow passages and control elements; (2) means for rotating the rotatable workpiece against the stationary workpiece; (3) an integrated drive-pressure mechanism, in which the means for rotating is disposed, the drive-pressure mechanism imparting a variable axial pressure between the workpieces for an adjustable time period, thereby inducing the phases to create a fusion weld between the workpieces; (4) a drive-pressure mechanism external housing, the control system disposed within the drive-pressure mechanism external housing; (5) a drive-pressure mechanism internal piston housing disposed within the lower part of the drive-pressure mechanism external housing; (6) a passive fusion bonding mechanism slidably coupled to the drive-pressure mechanism external housing and the drive-pressure mechanism internal piston housing, including a passive fusion bonding mechanism internal shaft bearing housing, a shaft for holding a rotatable fitting, the shaft disposed within the passive fusion bonding mechanism internal housing, and bearings attached to the shaft; (7) a fluid supply system including a plurality of pressure-flow passages operably connected to the drive-pressure mechanism external housing which conveys fluid to the drive-pressure mechanism to circulate pressurized fluid to and from the means for rotating, the drive-pressure mechanism and the control system; (8) a power source control piston valve in the drive-pressure mechanism external housing; (9) an upper pressurization chamber connected to the control flow passages and the power source control piston valve; (10) a start valve connected to the drive-pressure mechanism external housing for selectively starting circulation of the pressurized fluid to the apparatus; (11) a stop valve connected to the drive-pressure mechanism external housing for selectively stopping circulation of the pressurized fluid to the apparatus to stop rotatable motion; and (12) a regulating device connected to the drive-pressure mechanism external housing for selectively regulating the circulation of the pressurized fluid.

In one aspect of this embodiment of the invention, the variable axial pressure between the workpieces is increasing. In other aspects, the apparatus further includes a support means removeably engageable to the passive fusion bonding mechanism external housing and adapted to hold the stationary workpiece in a fixed axial relationship relative to the rotatable workpiece. The fluid supply system includes a source of pressurized air supplied directly through a main air supply within the drive-pressure mechanism external housing.

In still other aspects of this embodiment, the apparatus includes: (1) a first programmable timing means disposed within the drive-pressure mechanism external housing for releasing a forging pressure from the pressurized chambers after a preprogrammable time delay after the apparatus is shut down; (2) a second programmable timing means disposed within the drive-pressure mechanism external housing which overrides the control system to shut down the apparatus after a preprogrammed time period; and (3) a programmable timing means disposed within the drive-pressure mechanism external housing which overrides the control system to provide for a predetermined fusion operational period after the start valve has been depressed.

In other aspects of this embodiment, the apparatus further includes a preprogrammable fusion completion triggering device disposed within the drive-pressure mechanism external housing. The air flow speed through the fusion completion triggering device is in the range of high subsonic to supersonic.

In still other aspects of this embodiment, the fusion completion triggering device sends a pressure signal to a predetermined position relative to the drive-pressure mechanism internal housing. The apparatus further includes a fusion completion triggering device shaft and a threaded portion and the fusion completion triggering device is adjustable by being rotated along the threaded portion.

In another embodiment of the invention, a method of fusion bonding a rotatable workpiece to a stationary workpiece is provided. The method includes the steps of: (1) providing a drive-pressure mechanism; (2) providing a passive fusion bonding mechanism including an external housing; (3) providing a support assembly including a clamping mechanism; (4) securing the stationary workpiece to the clamping mechanism in a fixed, non-rotating relationship relative to the rotatable workpiece; (5) placing the rotatable workpiece in a contacting pressure relationship relative to the stationary workpiece; (6) maintaining the rotatable workpiece and the stationary workpiece in a relative axial orientation; (7) providing a source of pressurized fluid energy to the drive-pressure mechanism; (8) rotating the rotatable workpiece relative to the stationary workpiece, thereby inducing a burn-off phase and an upset phase; (9) increasing the axial contacting force between the rotatable workpiece and the stationary workpiece to a maximum pressure permitted by a fluid supply source pressure; (10) completing the fusion bonding process, thereby terminating rotation of the rotatable workpiece relative to the stationary workpiece; (11) maintaining the axial contacting force between the rotatable workpiece and the stationary workpiece at a rotation termination pressure, until released either manually or automatically after a forging cool-down time sufficient to fuse the rotatable workpiece to the stationary workpiece; and (12) removing the drive-pressure mechanism from the passive fusion bonding mechanism, thereby permitting removal of the clamping mechanism.

In one aspect of this method, the rotating step and the increasing axial contacting force step are accomplished by means of a programmable control system. In other aspects of this method, the method further includes the step of establishing a detachable encapsulation chamber around an area with a pliable gasket seal between the detachable detachable encapsulation chamber and the stationary workpiece at the point of contact between the rotatable workpiece and the stationary workpiece. The detachable detachable encapsulation chamber includes a chamber formed around the rotatable workpiece. The method further includes the step of providing a pressure in the detachable encapsulation chamber.

In still other aspects of this embodiment, the rotating step further includes simultaneously maintaining positive fluid pressure within the detachable encapsulation chamber. The rotating step also includes rotating the rotatable workpiece at a preprogrammable selected speed relative to the stationary workpiece.

In yet another aspect, the rotatable workpiece is maintained in an axial, contacting relationship relative to the stationary workpiece by the clamping mechanism. The clamping mechanism includes means for adjustably maintaining the stationary workpiece in a selected position relative to the rotatable workpiece. The clamping mechanism further includes a bracket of sufficient length to surround the stationary workpiece, with the bracket connected to the passive fusion bonding mechanism external housing, and a plurality of locking devices connected to the bracket. The bracket is connected to the passive fusion bonding mechanism external housing in a twist-locked fashion.

In yet another embodiment of the invention, a programmable control system for controlling an automated fusion bonding apparatus is provided, wherein the automated fusion bonding apparatus includes a drive-pressure mechanism, a drive-pressure mechanism external housing and two or more forging piston chambers, the drive-pressure mechanism slidably engaged to a passive fusion bonding mechanism which holds a rotatable workpiece, the drive-pressure mechanism causing the passive fusion bonding mechanism to rotate and move forward in an axial direction toward a stationary workpiece, so as to induce burn-off, upset, forging and fusion phases to produce a fusion weld between the workpieces, the programmable control system including: (1) a quick disconnect assembly through which plant air flows to the automated fusion bonding apparatus, the quick disconnect assembly releasably coupled to the drive-pressure mechanism external housing; (2) a power source control valve disposed within the drive-pressure mechanism external housing to turn on and shut off flow of the plant air; (3) a plurality of pressure-flow passages disposed within the drive-pressure mechanism external housing through which the plant air flows to a rotatable drive means, the forging piston chambers, the drive-pressure mechanism external housing, and the atmosphere as exhaust; (4) a start valve connected to the drive-pressure mechanism external housing which starts circulation of the plant air to the programmable system; (5) a stop valve connected to the drive-pressure mechanism external housing which stops circulation of the plant air to the programmable system; (6) a forging pressure relief valve disposed within the drive-pressure mechanism external housing; (7) diagnostic ports disposed within the drive-pressure mechanism external housing which measure pressure throughout the programmable control system; (8) a programmable regulator means disposed within the drive-pressure mechanism external housing which provides pressure to the piston chambers; (9) a programmable fusion completion triggering means disposed within the drive-pressure mechanism external housing which programs a desired position of the rotatable workpiece and measures the position of the rotatable workpiece in a fixed relationship with the stationary workpiece and stops circulation of the plant air to the drive-pressure mechanism when the position is reached; (10) a programmable first timing means disposed within the drive-pressure mechanism external housing for releasing a forging pressure from the piston chambers after a preprogrammable time delay after the apparatus is shut down; (11) a programmable second timing means disposed within the drive-pressure mechanism external housing which overrides the programmable control system to shut down the apparatus after a preprogrammed time period; (12) a programmable third timing means disposed within the drive-pressure mechanism external housing which overrides the programmable control system to provide for a predetermined fusion operational period after the start valve has been depressed; (13) a multiport valve connected to the drive-pressure mechanism external housing which overrides the start valve and the programmable control system; (14) a programmable governor means disposed within the drive-pressure mechanism which permits selection of a preprogrammable operation speed of the rotatable drive means; and (15) a programmable time delay means disposed within the drive-pressure mechanism external housing which delays a forging pressure rate of increase in one of the forging piston chambers while permitting a more rapid increase in pressure flow in the other forging piston chamber.

In one aspect of this embodiment, the plant air is pressurized and is supplied to the programmable control system through a pressure flow line releasably coupled to the rotatable drive means. In other aspects, the programmable first timing means, the programmable second timing means and/or the programmable third timing means are digital fluidic logic devices or analog fluid logic devices.

Accordingly, it is an object of the present invention to provide a fully automatic fusion bonding apparatus.

It is another object of the present invention to provide an automated fusion bonding apparatus which works independently of the operator during the welding process after the operator depresses the start button.

It is yet another object of the present invention to provide an automated fusion bonding apparatus which does not have separate drive means and pressure means coupled by one form or another.

It is still another object of the present invention to provide an automated fusion bonding apparatus which does not rely on holding the rotatable workpiece to be welded in the drive or axial movement means components.

Accordingly, it is a feature of the present invention to use a passive element component with operational integration achieved by a unique coupling element for holding the rotatable workpiece.

It is another feature of the present invention to provide a control system which offers manual emergency shutoff controls, timed shut-down for welds exceeding a preset time in the event of a failure of equipment or in the weld itself, and non-starting in case of failure to adapt safety modes.

An advantage of the present invention is that the operator is removed from making critical decisions, which would demand complex calculations prior to commencing the friction weld fusion bonding process.

Still another advantage of the present invention is that it is thus safer to use.

Other advantages of the present invention include: (1) it is lightweight; (2) it is universal in use in a wide variety of applications; and (3) it is operable off of filtered air supply sources conventionally found in industrial facilities, thus enhancing the flexibility of its application.

These and other objects, features, and advantages of the present invention may be more clearly understood and appreciated from a review of the following detailed description of the disclosed embodiments and by reference to the appended drawings and claims.

BRIEF DESCRIPTION OF THE DRAWING FIGURES

FIG. 1A is an overall cross-sectional side view of a preferred embodiment of the automated fusion bonding apparatus of the present invention.

FIG. 1E is a cross-sectional side view of the fusion completion triggering device and relief valve section of a preferred embodiment of the automated fusion bonding apparatus of the present invention.

FIGS. 2A and 2B are side views taken along lines A—A and B—B of FIG. 2C, respectively, of a preferred embodiment of the drive-pressure mechanism external housing end plate of the automated fusion bonding apparatus of the present invention.

FIG. 2C is a left proximal view of the drive-pressure mechanism external housing end plate of the automated fusion bonding apparatus of the present invention.

FIG. 2D is a right distal view of the drive-pressure mechanism external housing end plate of the automated fusion bonding apparatus of the present invention.

FIG. 3A is a side view taken along line A—A of FIG. 3C of a portion of a preferred embodiment of the drive-pressure mechanism upper intermediate external housing of the automated fusion bonding apparatus of the present invention.

FIG. 3B is a side view taken along line B—B of FIG. 3C of another portion of the drive-pressure mechanism upper intermediate external housing of the automated fusion bonding apparatus of the present invention.

FIG. 3C is a left proximal view of the drive-pressure mechanism upper intermediate external housing of the automated fusion bonding apparatus of the present invention.

FIG. 3D is a right distal view of a the drive-pressure mechanism upper intermediate external housing of the automated fusion bonding apparatus of the present invention.

FIG. 3E is a side view taken along line C—C of FIG. 3C of another portion of the drive-pressure mechanism upper intermediate external housing of the automated fusion bonding apparatus of the present invention.

FIG. 3F is a sectional view taken along line D—D of FIG. 3B of the drive-pressure mechanism upper intermediate external housing of the automated fusion bonding apparatus of the present invention.

FIG. 4A is a side cross-sectional view of a preferred embodiment of a power source-control piston of the automated fusion bonding apparatus of the present invention.

FIG. 4B is a left proximal view of a power source-control piston of the automated fusion bonding apparatus of the present invention.

FIG. 4C is a right distal view of a power source-control piston of the automated fusion bonding apparatus of the present invention.

FIG. 5A is a side view taken along line B—B of FIG. 5B of a preferred embodiment of the drive-pressure mechanism lower intermediate external housing of the automated fusion bonding apparatus of the present invention.

FIG. 5B is a left proximal view of the drive-pressure mechanism lower intermediate external housing of the automated fusion bonding apparatus of the present invention.

FIG. 5C is a side view taken along line A—A of FIG. 5B of a preferred embodiment of the drive-pressure mechanism lower intermediate external housing of the automated fusion bonding apparatus of the present invention.

FIG. 5D is a right distal view of the drive-pressure mechanism lower intermediate external housing of the automated fusion bonding apparatus of the present invention.

FIG. 6A is a side view of a preferred embodiment of the fusion completion triggering device of the automated fusion bonding apparatus of the present invention.

FIG. 6B is a cross-sectional side view of a preferred embodiment of the fusion completion triggering device of the automated fusion bonding apparatus of the present invention.

FIG. 6C is a left distal view of the fusion completion triggering device of the automated fusion bonding apparatus of the present invention.

FIG. 6D is a right proximal view of the fusion completion triggering device of the automated fusion bonding apparatus of the present invention.

FIG. 7A is a cross-sectional side view of the fusion completion triggering device of the automated fusion bonding apparatus of the present invention.

FIG. 7B is a right proximal view of the fusion completion triggering device of the automated fusion bonding apparatus of the present invention.

FIG. 7C is a side view of a preferred embodiment of the fusion completion triggering device of the automated fusion bonding apparatus of the present invention.

FIG. 11A is a cross-sectional side view taken along line A—A of FIGS. 11B and 11C of a preferred embodiment of the drive-pressure mechanism lower external housing of the automated fusion bonding apparatus of the present invention.

FIG. 11B a left proximal view of the drive-pressure mechanism lower external housing of the automated fusion bonding apparatus of the present invention.

FIG. 11C a right distal view of the drive-pressure mechanism lower external housing of the automated fusion bonding apparatus of the present invention.

Figures 12A, 12B, 12C:
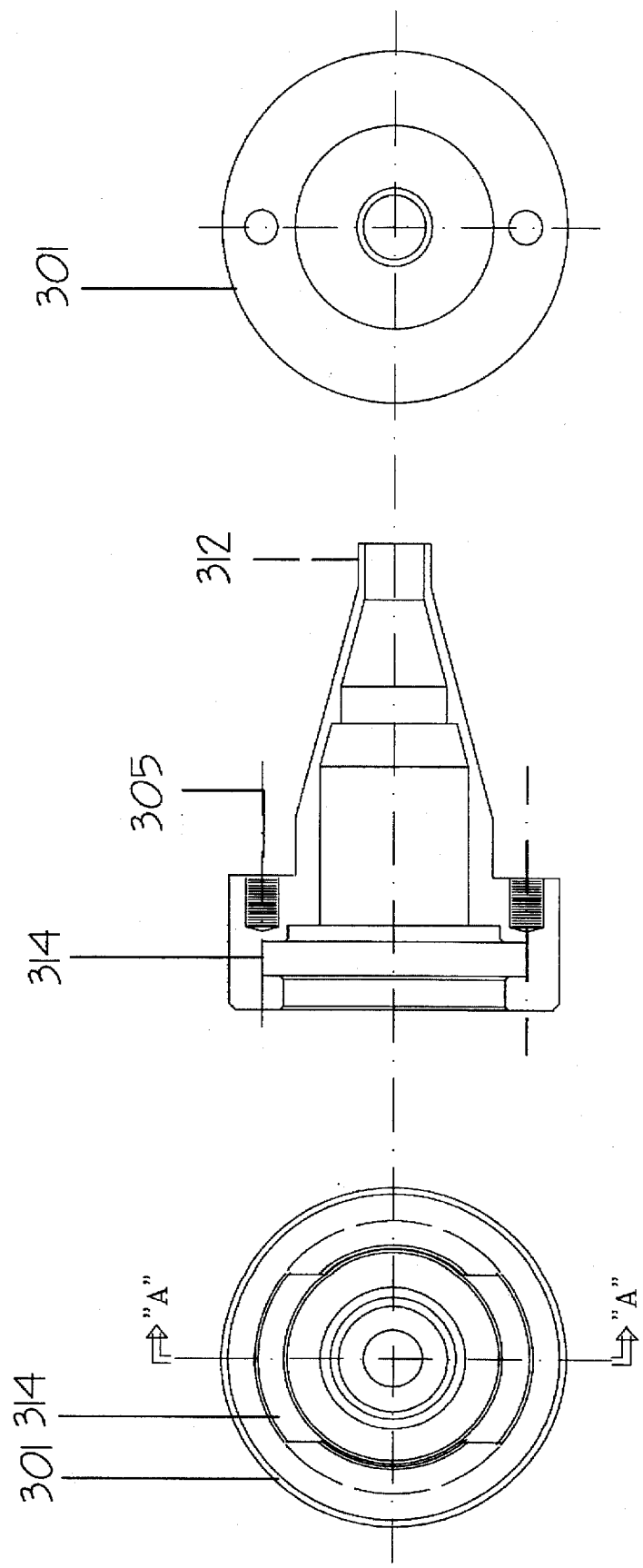

FIG. 12A is a cross-sectional side view taken along line A—A of FIG. 12B of a preferred embodiment of the passive fusion bonding mechanism external housing of the automated fusion bonding apparatus of the present invention.

FIG. 12B is a left proximal view of the passive fusion bonding mechanism external housing of the automated fusion bonding apparatus of the present invention.

FIG. 12C is a right distal view of the passive fusion bonding mechanism external housing of the automated fusion bonding apparatus of the present invention.

FIG. 13A is a cross-sectional side view taken along line B—B of FIG. 13B of a preferred embodiment of the passive fusion bonding mechanism shaft bearing housing of the automated fusion bonding apparatus of the present invention.

FIG. 13B is the left proximal view of the passive fusion bonding mechanism shaft bearing housing of the automated fusion bonding apparatus of the present invention.

FIG. 13C is the right distal view of the passive fusion bonding mechanism shaft bearing housing of the automated fusion bonding apparatus of the present invention.

Figures 14A, 14B, 14C:
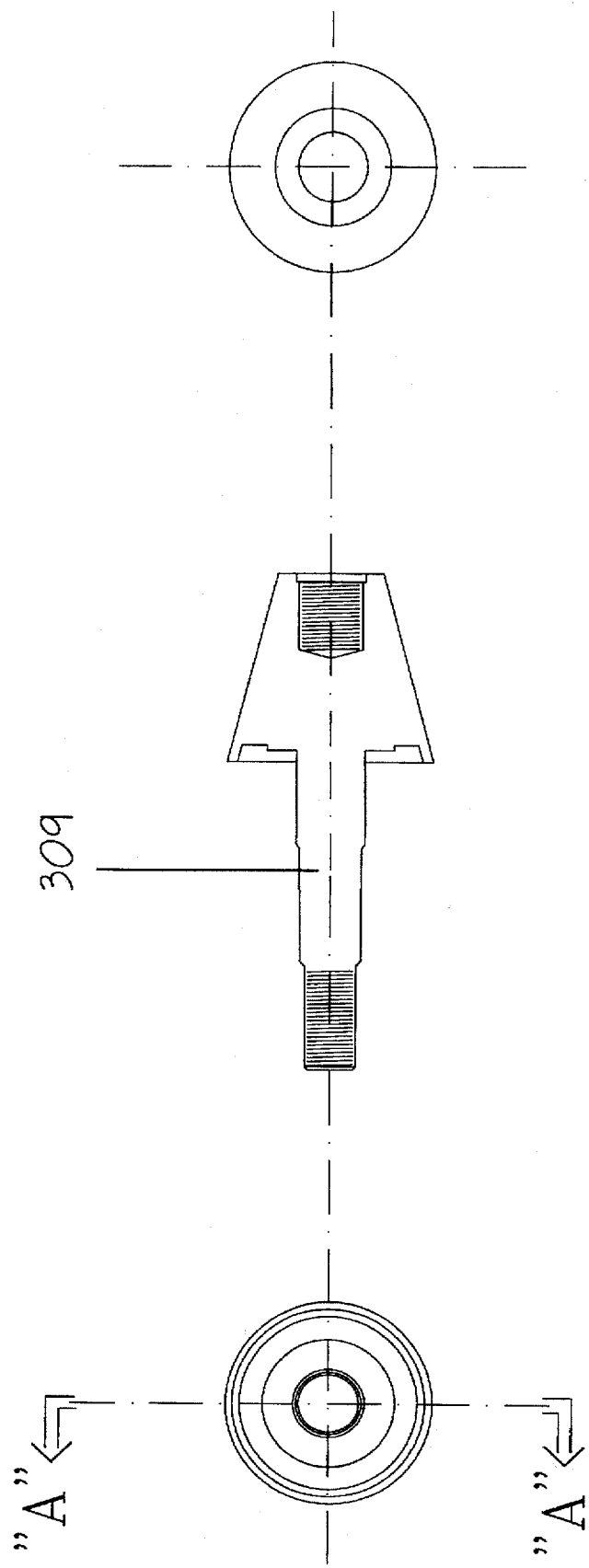

FIG. 14A is a cross-sectional side view taken along line A—A of FIG. 14B of a preferred embodiment of the passive fusion bonding mechanism shaft of the automated fusion bonding apparatus of the present invention.

FIG. 14B is the left proximal view of the passive fusion bonding mechanism shaft of the automated fusion bonding apparatus of the present invention.

FIG. 14C is the right distal view of the passive fusion bonding mechanism shaft of the automated fusion bonding apparatus of the present invention.

Figure 15:
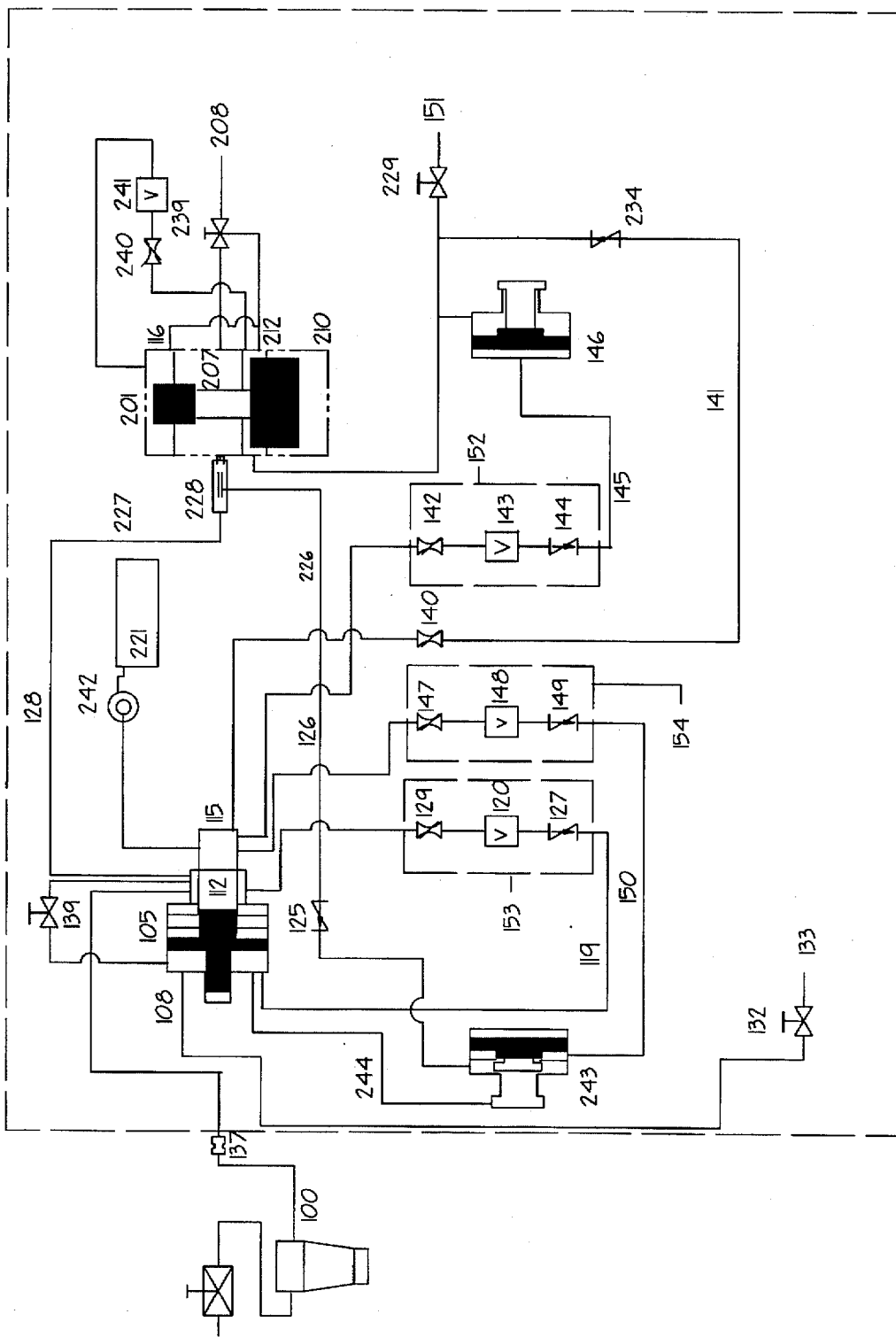

FIG. 15 is a schematic of the control system of a preferred embodiment of the automated fusion bonding apparatus of the present invention.

DETAILED DESCRIPTION OF THE PREFERRED EMBODIMENT

Referring initially to FIGS. 1A–1E of the drawings, in which like numerals indicate like elements throughout the several views, in a preferred embodiment the automated fusion bonding apparatus of this invention is generally illustrated by reference numeral 10.

The automated fusion bonding apparatus 10 is set forth in FIGS. 1A–15, and generally includes a plant air supply 100, a drive-pressure mechanism 200, a passive fusion bonding mechanism 300, a support means or stationary workpiece clamping mechanism 400, a rotatable workpiece 500 and a stationary workpiece 600. These components are integrally coupled in a manner described below.

Referring to FIGS. 1A–1E, plant air supply 100 provides for the source of pressurized fluid energy. Drive-pressure mechanism 200 provides for supplying and shutting off of the primary air supply and controls automated fusion bonding apparatus 10. A power source quick disconnect 137 allows greater ease in transportation and set up of automated fusion bonding apparatus 10, as well as emergency disconnect of the power source when an immediate shut down might be necessary. Power source quick disconnect 137 is installed via mating threads in a power source inlet port 138. In a preferred embodiment, power source inlet port 138 is located on a drive-pressure mechanism upper intermediate external housing 117, located at the distal end when viewed with respect to passive fusion bonding mechanism 300 and stationary workpiece 600. Drive-pressure mechanism upper intermediate external housing 117 may be formed of molded aluminum, plastic or other strong, lightweight materials.

By further reference to FIGS. 1A–1E, 3A–3E, 6A–6D, and 8A–8C, fluid entering power source inlet port 138 is channeled to a power source-control peripheral manifold 112, the geometry of which permits the required air flow to be maintained at operation inlet pressures of approximately 80 to 125 PSI, with flow volume requirements depending on the size of automated fusion bonding apparatus 10, generally within the range of 5–100 cubic feet per minute. When air supply 100 is connected to automated fusion bonding apparatus 10, the air is dead-ended at power source-control peripheral manifold 112. At this point, air is immediately supplied to a fusion completion triggering device 228, a stop valve 139 and a control system pressure-flow impedance device 129. A power source control piston valve seal 113 is moved off a power source-control piston valve seat 114. When power source control piston valve seal 113 moves off power source control piston valve seat 114, plant air supply 100 enters a drive-pressure mechanism upper intermediate external housing exit passage 115, thereby supplying air to a rotatable drive means 221, a control system pressure-flow regulating device 140, pressure-flow impedance devices 142, 147, and a pressure flow passage 119. Control system pressure-flow impedance device 129 regulates flow into a one way flow device 127, on through a delay control device 120, and then on through a pressure flow passage 119.

Pressure flow impedance device 147 regulates fluid flow to a volume pressure-flow delay element 148, to a one way flow device 149, on through a pressure-flow passage 150, to a differential pressure relief valve 243. A power source-control piston upper chamber 108 normally vents through a pressure-flow passage 244 until a preset time delay is reached. Power source-control piston upper chamber 108 will not be pressurized by fusion completion triggering device 228 until the preset time delay is reached, at which time a power source-control piston 105 is permitted to move toward power source-control piston valve seat 114.

Referring to FIGS. 1E, 6B and 7A, fusion completion triggering device 228 is adjustable and is disposed within a fusion completion triggering device housing 245. Fusion completion triggering device housing 245 is threadedly disposed within a drive-pressure mechanism lower intermediate external housing 201 via a mating of internal mating threads 248 with external mating threads 249. Fusion completion triggering device 228 is threadedly disposed within a fusion completion triggering device shaft 247 via a mating of threaded portion 246 with fusion completion triggering device threaded portion 250.

Again referring to FIGS. 1A–1E, additional components contained in drive-pressure mechanism upper intermediate external housing 117 are a drive-pressure mechanism external housing end plate 101, one way flow valve 125, pressure flow passages 124, 126, 128, 226, 227, an o-ring 130, and an o-ring seal 131. Fusion completion triggering device 228, which is pressurized by pressure flow passages 128, 227, senses an axial position of a drive-pressure mechanism upper internal piston housing 213 and sends a pressure flow signal through (1) pressure flow passages 126, 226, (2) through one way flow valve 125, (3) to pressure flow passage 124, and (4) into power source-control piston upper chamber 108 to control power source-control piston 105.

Referring to FIGS. 2A–2D and 4A–4C, power source-control piston valve seal 113 is made of a pliable material for sealing purposes, and is attached to power source-control piston 105. Power source-control piston 105 slides axially within drive-pressure mechanism upper intermediate external housing 117 and drive-pressure mechanism external housing end plate 101 on power source-control piston seals 103, 104, 109 and 111, which are made of pliable sealing material and provide for maintaining fluid pressure differentials across power source-control piston 105.

With further reference to FIGS. 1A–1E, 2A–2D and 4A–4C, when the air is connected to automated fusion bonding apparatus 10 and automated fusion bonding apparatus 10 is initially pressurized, a positive pressure differential is formed across power source-control piston 105 to force a forward sliding movement axially toward drive-pressure mechanism 200, within drive-pressure mechanism upper intermediate external housing 117 and drive-pressure mechanism external housing end plate 101. This causes power source-control piston valve seal 113 to automatically seat on power source-control piston valve seat 114, forming a closed position, so that no air is permitted to flow in the system. Power source-control piston 105 employs power source-control piston pressure-flow passages 102 to bring air into the system as soon as the main air source is energized. Power source-control piston 105 also uses a power source-control piston spring 122 housed in a power source-control piston recess area 121 to assure that power source-control piston 105 is maintained in the shut-off position during start-up conditions.

Power source-control piston 105 utilizes power source-control piston seals 103, 104, 109 and 111, and a drive-pressure mechanism upper intermediate external housing o-ring seal 106 located between drive-pressure mechanism external housing end plate 101 and drive-pressure mechanism upper intermediate external housing 117, to assure that there is no fluid pressure leakage across power source-control piston 105 which could disrupt the integrity of the differential pressure force across power source-control piston 105.

Referring to FIGS. 1A–1E, 6A–6D and 7A–7C, drive-pressure mechanism upper intermediate external housing o-ring seal 106 an o-ring 123 prevent air from escaping to the atmosphere from power source-control piston upper chamber 108. One way flow valve 125 prevents air from escaping from power source-control piston upper chamber 108 through fusion completion triggering device 228 via pressure flow passages 126, 226.

Referring to FIGS. 2A–2D, when power source-control piston 105 is completely pressurized, generally within a fraction of a second after the main air supply is energized, a control system start valve 132 can be depressed to release the pressure in power source-control piston upper chamber 108, thus causing power source-control piston 105 to force a backward sliding movement axially toward drive-pressure mechanism external housing end plate 101. A power source-control lower piston chamber 110 is continually vented to the atmosphere through a vent flow passage 135 to provide a greater differential pressure across power source-control piston 105.

With further reference to FIGS. 1A–1E, 8A–8C and 15, the activation of control system start valve 132 vents power source-control piston upper chamber 108 via a control system start valve vent passage 133, causing fluid (air) to flow in different directions, including to drive-pressure mechanism upper intermediate external housing exit passage 115 to supply rotatable drive means 221 and control system pressure-flow regulating device 140.

Stop valve 139 is used to repressurize power source-control piston upper chamber 108 after control system start valve 132 has been depressed to start the system. Stop valve 139 is connected to power source-control peripheral manifold 112, which is pressurized when the main supply fluid is provided via power source quick disconnect 137 and power source inlet port 138. Fluid flows from power source-control peripheral manifold 112 through stop valve 139 and to power source-control piston upper chamber 108 via an emergency stop exit flow passage 134 and an interconnecting emergency stop exit pressure-flow passage 136.

By further reference to FIGS. 1A–1E, 5A–5D, 9A–9C, 10A–10C, 11A–11C and 15, drive-pressure mechanism 200 includes rotatable drive means 221 which is located in drive-pressure mechanism upper internal piston housing 213 and a drive-pressure mechanism lower internal piston housing 224 (collectively the drive-pressure mechanism internal piston housing). Rotatable drive means 221 may be a conventional rotatable drive means, such as an air motor, or a modification thereof, depending on the required horsepower, rotational speed and torque output requirements for automated fusion bonding apparatus 10. Drive-pressure mechanism upper internal piston housing 213 and drive-pressure mechanism lower internal piston housing 224 are slidably and axially located in drive-pressure mechanism lower intermediate external housing 201 and a drive-pressure mechanism lower external housing 210 (drive-pressure mechanism upper intermediate external housing 117, drive-pressure mechanism lower intermediate external housing 201 and drive-pressure mechanism lower external housing 210 are collectively the drive-pressure mechanism external housing). Drive-pressure mechanism upper internal piston housing 213 and drive-pressure mechanism lower internal piston housing 224 are bolted together with eight (8) drive-pressure mechanism housing bolts 218. The number of bolts 218 may vary depending on the configuration of drive-pressure mechanism upper internal piston housing 213 and drive-pressure mechanism lower internal piston housing 224.

Drive-pressure mechanism external housing end plate 101, drive-pressure mechanism upper intermediate external housing 117 and drive-pressure mechanism lower intermediate external housing 201 are bolted together with bolts 203 which fit through bolt holes 107.

Drive-pressure mechanism lower intermediate external housing 201 is bolted to drive-pressure mechanism lower external housing 210 with eight (8) bolts 216. The number of bolts 216 may vary depending on the configuration of drive-pressure mechanism lower intermediate external housing 201 and drive-pressure mechanism lower external housing 210.

Maintaining a positive pressure seal between drive-pressure mechanism upper internal piston housing 213 and drive-pressure mechanism lower internal piston housing 224 to assure that no fluid (air) leakage occurs, into or out of the system, is achieved by a rotatable drive means-piston upper housing o-ring seal 215.

It will be appreciated that electrical, mechanical, or hydraulic power sources, acting as other drive and power means, may be used. It is desirable, however, that any power source generate sufficient torque, horsepower, and rotational speed, and be of a light enough weight to carry out the objectives of the present invention in a portable friction weld apparatus. Depending on the portable application, rotatable drive means 221 may generate from 0.2 horsepower and 0.30 foot-pounds of torque to over 3 horsepower and 10 foot-pounds of torque, at rotational speeds of 1,000 revolutions per minute to over 20,000 revolutions per minute. Rotatable drive means 221 should be as light as possible and, depending on the application, should weigh approximately ½ to 10 pounds.

In a preferred embodiment, rotatable drive means 221 is an Ingersoll Rand Model No. 88H90 air motor. Rotatable drive means 221 is operable via plant air, at pressurized air sources ordinarily found at industrial facilities and maintenance shops, which generally provide air in the range of 80 to 125 PSIG. Rotatable drive means 221 lubrication access is provided by a set screw 209.

Typically, the torque associated with the operation of rotatable drive means 221 could cause reverse forces, which could tend to cause anti-rotation movement of rotatable drive means 221 within drive-pressure mechanism upper internal piston housing 213 and drive-pressure mechanism lower internal piston housing 224. This anti-rotation movement is constrained by a rotatable drive means anti-rotational pin 214 which restrains rotatable drive means 221 and is fixed in drive-pressure mechanism upper internal piston housing 213. Additionally, drive-pressure mechanism upper internal piston housing 213 could also have a tendency to rotate in the opposite direction of rotatable drive means 221 rotation. Therefore, an extended rotatable drive means piston anti-rotational device 235 is used to prevent rotation.

Again with reference to FIGS. 1A-1E and 15, a number of special seals are used to contain pressure balances within drive-pressure mechanism 200. A drive-pressure mechanism upper intermediate external housing o-ring seal 118 prevents pressurized fluid from leaking from a secondary forging piston chamber 116 to the atmosphere during forging pressure modes. A drive-pressure mechanism upper intermediate external housing o-ring seal 230 prevents pressurized fluid from leaking from secondary forging piston chamber 116 through a primary forging pressure-flow passage 233 to the atmosphere.

A drive-pressure mechanism upper intermediate external housing interface seal 205, located on the outer side of the extended shaft section of drive-pressure mechanism upper intermediate external housing 117, prevents air from drive-pressure mechanism upper intermediate external housing exit passage 115 from pressurizing secondary forging piston chamber 116 during the time rotatable drive means 221 is in operation.

A drive-pressure mechanism upper intermediate external housing interface seal 204, located on the inner side of the extended section of drive-pressure mechanism upper intermediate external housing 117, prevents air from secondary forging piston chamber 116 from venting to drive-pressure mechanism upper intermediate external housing exit passage 115 when rotatable drive means 221 is shut down, but forging pressure needs to be maintained.

Drive-pressure mechanism upper intermediate external housing interface seal 204 also prevents air from secondary forging piston chamber 116 from escaping into a drive-pressure mechanism upper intermediate external housing vent chamber 207 via a drive-pressure mechanism upper intermediate external housing vent port 208, and on to the atmosphere, when forging pressurization is required.

A multiport valve 239 is disposed within drive-pressure mechanism lower intermediate external housing 201. Multiport valve 239 blocks fluid flow from drive-pressure mechanism upper intermediate external housing vent port 208, while at the same time venting secondary forging piston chamber 116 and primary forging piston chamber 212, so as to prevent inadvertent start up of automated fusion bonding apparatus 10.

A secondary forging piston seal 202 prevents air from secondary forging piston chamber 116 from escaping to the atmosphere via drive-pressure mechanism upper intermediate external housing vent port 208 when forging pressurization is required. A secondary forging piston seal 206 prevents air from a primary forging piston chamber 212 from escaping to the atmosphere via drive-pressure mechanism upper intermediate external housing vent port 208, when forging pressurization is required.

A drive-pressure mechanism upper intermediate external housing o-ring seal 211 prevents air from primary forging piston chamber 212 from escaping to the atmosphere during forging operation. Primary forging piston seals 217, 219 prevent air from primary forging piston chamber 212 from escaping to the atmosphere when forging pressurization is required.

Forging pressure is maintained in secondary forging piston chamber 116 and power source-control peripheral manifold 112 until such time as a manual forging pressure relief valve 229 is depressed to vent forging pressure via a forging pressure vent passage 151. After this time, pressure is released via an upper forging pressure passage 232 and primary forging pressure-flow passage 233. Pressure is maintained by a one way flow valve 234 which prevents fluid pressure flow from venting to a fluid flow passage 141 and control system pressure-flow regulating device 140.

Referring to FIG. 15, automatic forging pressure relief is programmed and timed by pressure flow impedance device 142, which regulates a volume pressure-flow delay element 143, a one way flow device 144, a pressure-flow passage 145, and a differential pressure relief valve 146, which, when the program time delay is reached, vents the forging pressure flow from forging pressure vent passage 151 to the atmosphere. Forging pressure can be modified via one or more diagnostic or monitoring ports 231.

Programmable time delay when operating two or more forging pistons is provided by an adjustable flow impedance device 240 and a volume chamber 241, thus providing greater capability during the fusion bonding forging process. The system can be programmed to use one force level or two or more force levels. A programmable rotational speed means such as a drive means programmable governor 242 can be used to preset selected rotatable drive means rotation speeds. Drive means programmable governor 242 can be a mechanical adjustable governor, a pneumatic adjustable governor or a pneumatic flow limiting governor.

Again with reference to FIGS. 1A-1E, rotatable drive means piston upper housing o-ring seal 215 assures that no fluid will pass from rotatable drive means 221 exhaust to primary forging piston chamber 212 when rotatable drive means 221 is operating or is shut down during the forging process.

Drive-pressure mechanism lower internal piston housing 224 has slotted vents 222 for permitting rotatable drive means 221 exhaust to vent to the atmosphere through two opposing sets of drive-pressure mechanism lower external housing slotted vents 220 located in drive-pressure mechanism lower external housing 210. A drive-pressure mechanism lower internal piston housing friction release seal 225 provides for a positive force to delay the forward axial movement of drive-pressure mechanism upper internal piston housing 213 and drive-pressure mechanism lower internal piston housing 224, thus balancing the positive forward acting pressure caused by the pressure differential that may exist within rotatable drive means 221 and the cavity between drive-pressure mechanism upper intermediate external housing interface seal 205. A drive-pressure mechanism lower internal piston housing pressure-flow bleed passage 223 provides for automatic pressurization fluid to enter passive fusion bonding mechanism 300 to provide a positive pressure within automated fusion bonding apparatus 10 during hazardous conditions.

A twist lock projected extension geometry 236 found in drive-pressure mechanism lower external housing 210 mates with a passive fusion bonding mechanism external housing twist lock geometry 314 to provide quick assembly of drive-pressure mechanism 200 to passive fusion bonding mechanism 300. A recessed geometry urging plate 237 located at the lower end of drive-pressure mechanism lower external housing 210 mates with a passive fusion bonding mechanism internal housing mating geometry 315, which is made part of a passive fusion bonding mechanism shaft-bearing housing 306.

Passive fusion bonding mechanism 300 is slidably coupled to drive-pressure mechanism 200. Passive fusion bonding mechanism 300 has no independent control capability, pressure means capability or drive means capability. Rather, passive fusion bonding mechanism 300 is controlled entirely by drive-pressure mechanism 200.

Referring to FIGS. 1A–1E, 12A–12C, 13A–13C and 14A–14C, a passive fusion bonding mechanism external housing 301 is designed to attach to stationary workpiece clamping mechanism 400 and houses passive fusion bonding mechanism shaft-bearing housing 306 and a passive fusion bonding mechanism power rotatable workpiece shaft 309. Passive fusion bonding mechanism friction release seals 303, 307 are installed on passive fusion bonding mechanism shaft-bearing housing 306 to provide an initial friction force, which overcomes the pressure differential found in drive-pressure mechanism 200.

Rotatable drive means 221 is coupled to passive fusion bonding mechanism power rotatable workpiece shaft 309 via an engagement mechanism such as a shaft or spline coupling element 310 to provide rotational motion to rotatable workpiece 500. Pressure on rotatable workpiece 500 is obtained when drive-pressure mechanism lower internal piston housing 224 mates with passive fusion bonding mechanism shaft-bearing housing 306, forming a positive interlock. Drive-pressure mechanism 200 forces passive fusion bonding mechanism shaft-bearing housing 306 and passive fusion bonding mechanism power rotatable workpiece shaft 309 toward stationary workpiece 600 while rotatable workpiece 500 is rotating at high speed.

Passive fusion bonding mechanism power rotatable workpiece shaft 309 rides on and is held rigid by a passive fusion bonding mechanism shaft radial bearing 304, backed up by a spacer 302, designed to withstand radial forces while maintaining alignment. A passive fusion bonding mechanism shaft thrust bearing 308 is designed to withstand high thrust, radial and pressure forces while maintaining alignment of passive fusion bonding mechanism power rotatable workpiece shaft 309 within passive fusion bonding mechanism shaft-bearing housing 306 and passive fusion bonding mechanism external housing 301. Anti-rotation stability is maintained by an anti-rotation device 311.

An encapsulation chamber 312 is a shroud, detachable from passive fusion bonding mechanism external housing 301, and a seal 313 between encapsulation chamber 312 and stationary workpiece 600 is maintained by a pliable gasket. A rotatable drive means output shaft 238 is disposed within drive-pressure mechanism lower internal piston housing 224 and is coupled to passive fusion bonding mechanism power rotatable workpiece shaft 309 via spline coupling element 310 to hold and spin rotatable workpiece 500.

Passive fusion bonding mechanism power rotatable workpiece shaft 309 is preferably threaded at one end to accept rotatable workpiece 500. Other geometries which may be used (not shown) include, but are not limited to, square and asymmetrical geometries. Passive fusion bonding mechanism power rotatable workpiece shaft 309 will accept a variety of adapters for various rotatable workpieces. One such adapter, an acceleration rotatable workpiece clamp (not shown) will permit the slipping in of rotatable workpiece 500, which tightens up during rotation and once again becomes a slip fit during the shutdown position.

Referring to FIGS. 1A–1E, rotatable workpiece 500 can be of diverse geometry. Rotatable workpiece 500 can be threaded into passive fusion bonding mechanism power rotatable workpiece shaft 309 or installed by an acceleration rotatable workpiece clamp or slip-in non-threaded geometry (not shown). It is contemplated that rotatable workpiece 500 may be constructed from stainless steel, carbon steel, aluminum, brass, other common metals, plastics and ceramics. Rotatable workpiece 500 is comprised of three areas, a contact fusion area 501, an upset area 502 and an attachment area 503.

Figure 1B:
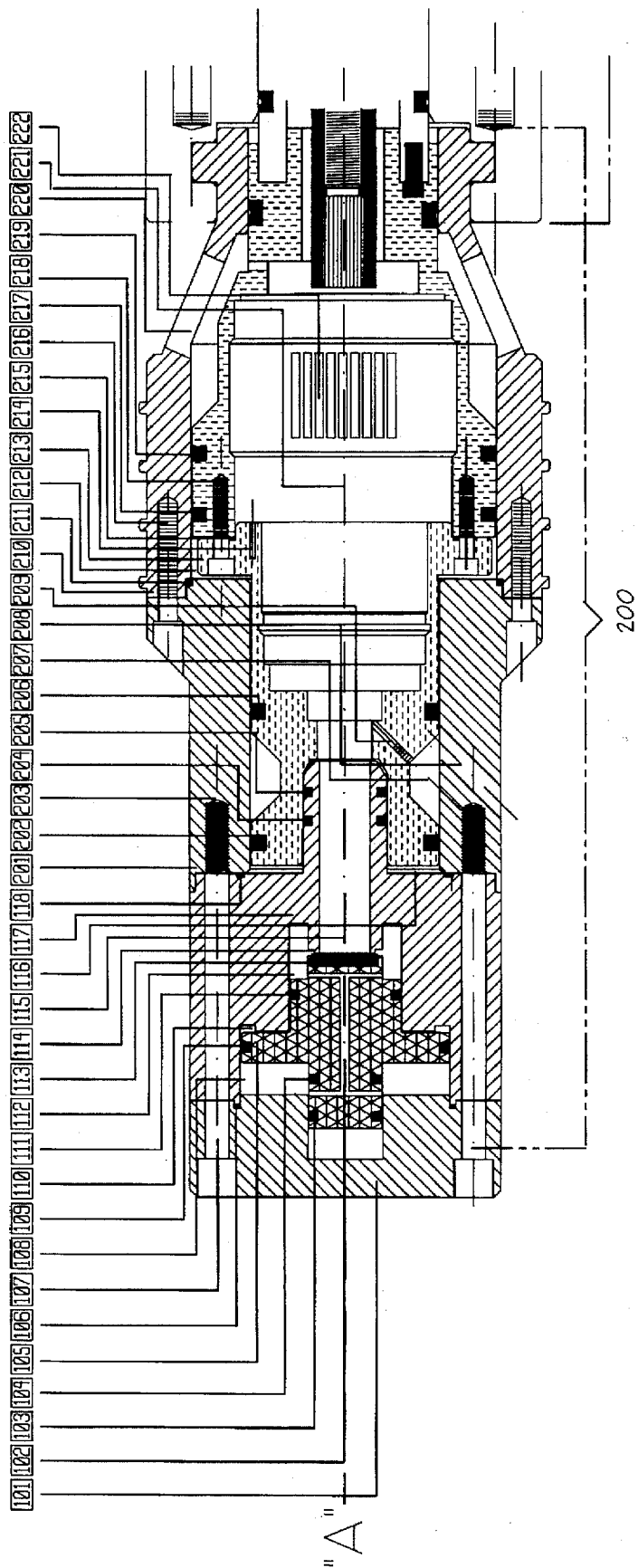
FIG. 1B is a cross-sectional side view of the drive-pressure mechanism general operating section of a preferred embodiment of the automated fusion bonding apparatus of the present invention.
Figure 1C:
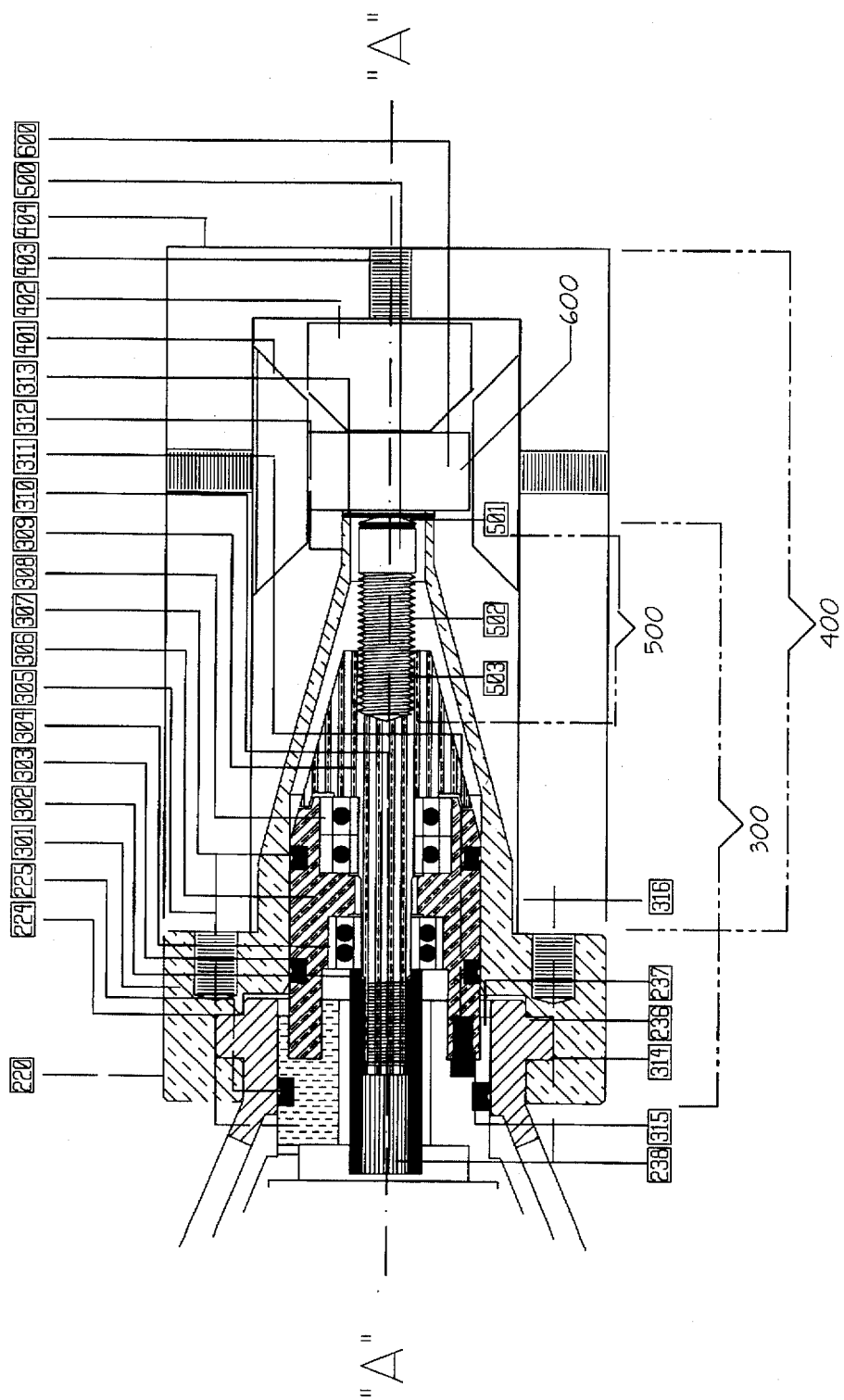
FIG. 1C is a cross-sectional side view of the passive fusion bonding mechanism general operating section of a preferred embodiment of the automated fusion bonding apparatus of the present invention.
Figure 1D:
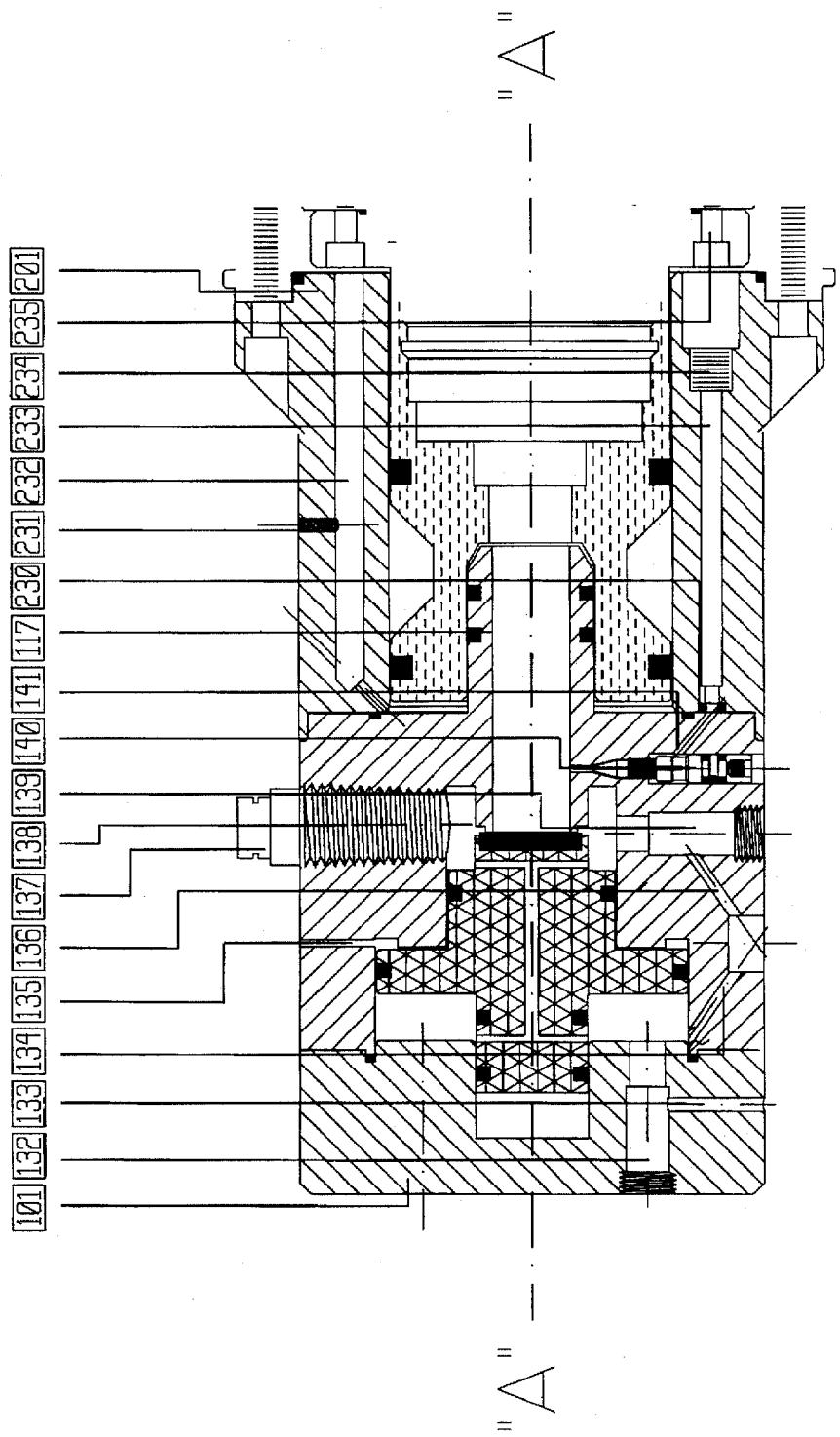
FIG. 1D is a cross-sectional side view of the start valve, stop valve, fluid pressure regulator and control section of a preferred embodiment of the automated fusion bonding apparatus of the present invention.
Figure 8C:
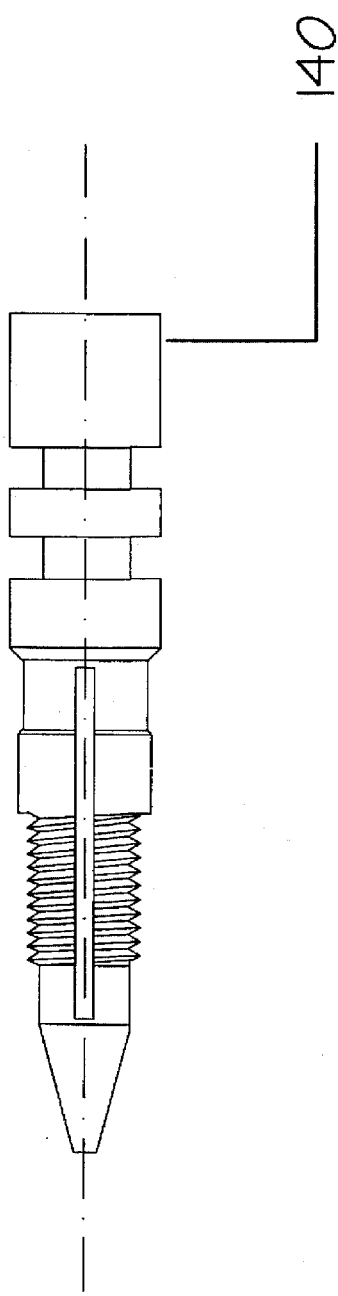
FIG. 8C is a side view of a preferred embodiment of the control system pressure flow regulating device of the automated fusion bonding apparatus of the present invention.
Figure 8A:
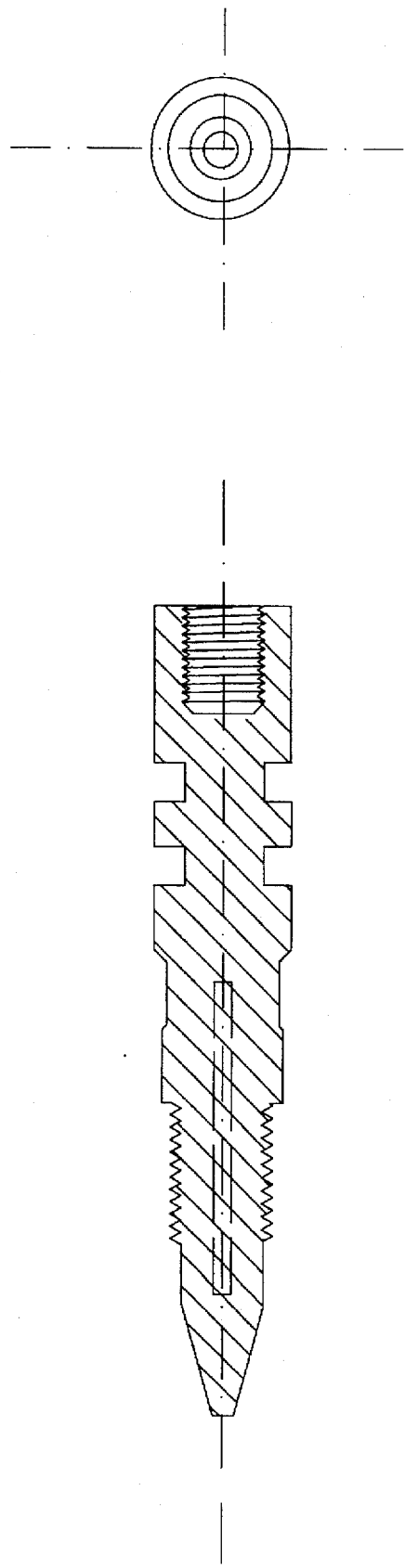
FIG. 8A is a cross-sectional side view of the control system pressure flow regulating device of the automated fusion bonding apparatus of the present invention.
Figure 8B:
FIG. 8B is a right proximal view of the control system pressure flow regulating device of the automated fusion bonding apparatus of the present invention.
Figures 9A, 9B, 9C:
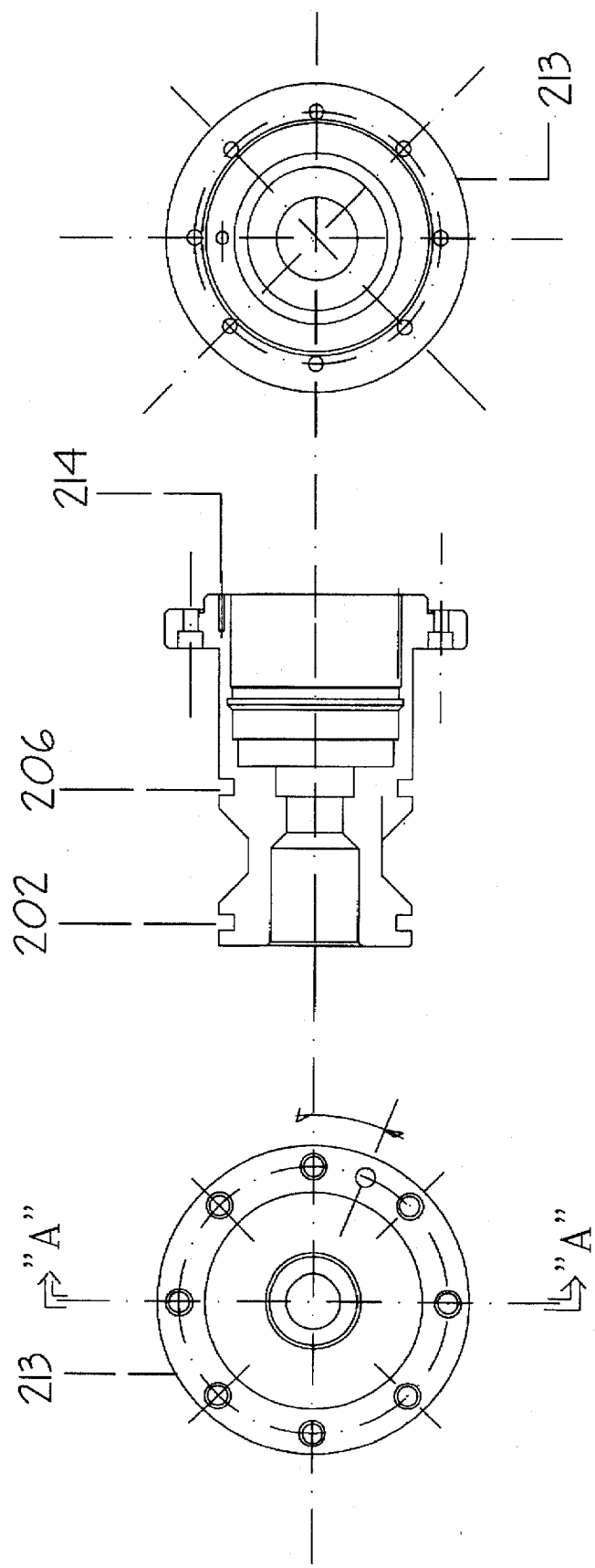
FIG. 9A is a cross-sectional side view taken along line A—A of FIG. 9B of a preferred embodiment of the drive-pressure mechanism upper internal piston housing of the automated fusion bonding apparatus of the present invention.
FIG. 9B is a left proximal view of the drive-pressure mechanism upper internal piston housing of the automated fusion bonding apparatus of the present invention.
FIG. 9C is a right distal view of the drive-pressure mechanism upper internal piston housing of the automated fusion bonding apparatus of the present invention.
Figures 10A, 10B, 10C:
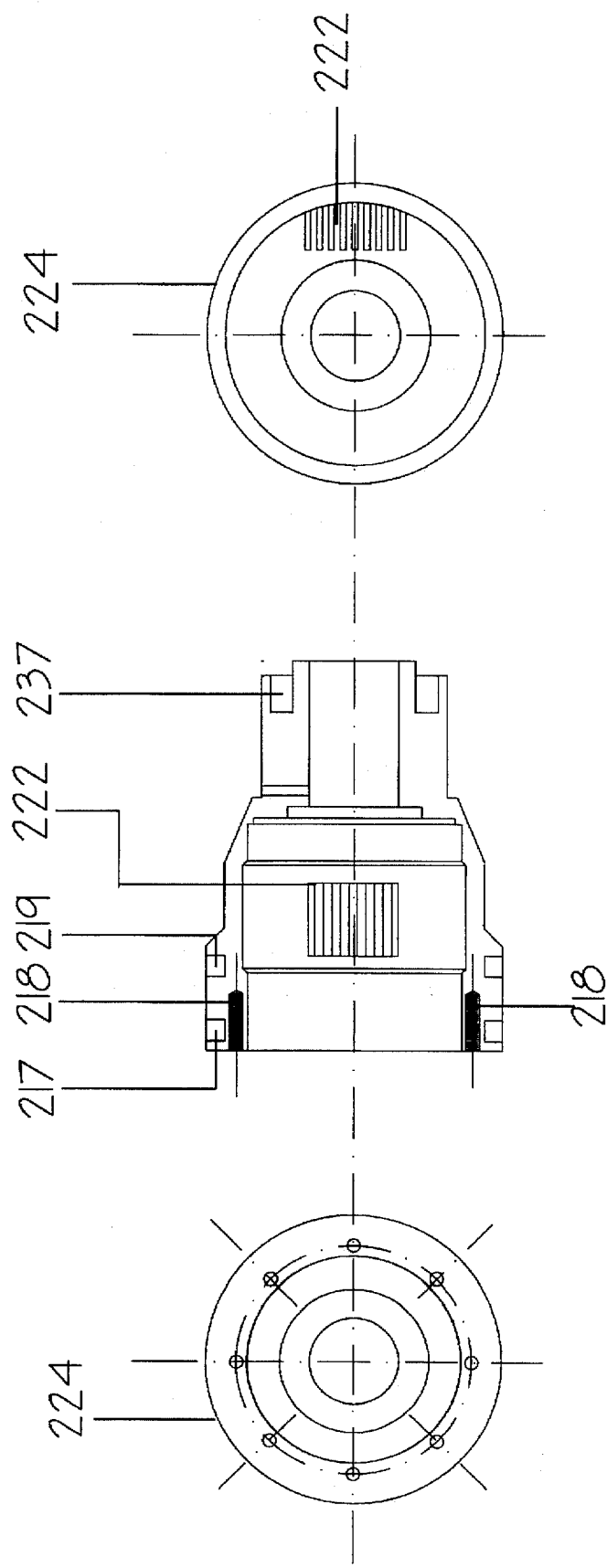
FIG. 10A is a cross-sectional side view of a preferred embodiment of the drive-pressure mechanism lower internal piston housing of the automated fusion bonding apparatus of the present invention.
FIG. 10B is a left proximal view of the drive-pressure mechanism lower internal piston housing of the automated fusion bonding apparatus of the present invention.
FIG. 10C is a right distal view of the drive-pressure mechanism lower internal piston housing of the automated fusion bonding apparatus of the present invention.

Again referring to FIGS. 1A–1E, stationary workpiece clamping mechanism 400 is adaptable to a variety of stationary surfaces to which rotatable workpiece 500 is to be fused. Other clamping elements such as a chain, direct bolting, etc., (not shown) are also adaptable to the present invention. A workpiece clamping bracket 404 is easily adapted to passive fusion bonding mechanism external housing 301 via conventional bolts (not shown) which thread into clamping mechanism threaded fasteners or installation threads 305 or preferably, via an interlocking clamping support geometry 316, as shown in FIG. 1C, for quick installation of passive fusion bonding mechanism 300.

The advantage of utilizing passive fusion bonding mechanism 300 with stationary workpiece clamping mechanism 400 is that drive-pressure mechanism 200 can be used for a variety of differently shaped passive fusion bonding mechanisms 300 and stationary workpiece clamping mechanisms 400. This flexibility provides for more economical operation of automated fusion bonding apparatus 10.

Stationary workpiece clamping mechanism 400 provides for adjustable arms which are one or more perpendicular geometric locking devices 402 and one or more linear or inline geometric locking devices 401, which are shaped for particular applications and interchanged within stationary workpiece 600. Perpendicular geometric locking devices 402 and inline geometric locking devices 401 are adjusted toward stationary workpiece 600 via geometric interlocking bolt fasteners 403. Other conventional devices for tightening stationary workpiece clamping mechanism 400 against stationary workpiece 600 are the use of snap lock fasteners, magnetic clamping devices, and chain clamping devices (not shown).

OPERATION

Operation of automated fusion bonding apparatus 10 is governed by drive-pressure mechanism 200. For the purpose of the following discussion, the upper proximal end of automated fusion bonding apparatus 10 is identified as drive-pressure mechanism external housing end plate 101 and the lower distal end of automated fusion bonding device 10 is identified as stationary workpiece clamping mechanism 100.

Prior to commencing the friction welding fusion bonding process, the operator must first install rotatable workpiece 500 into passive fusion bonding mechanism power rotatable workpiece shaft 309. The operator then connects (1) passive fusion bonding mechanism 300 to stationary workpiece clamping mechanism 400 with bolts (not shown) inserted in clamping mechanism installation threads 305; and (2) stationary workpiece clamping mechanism 400 around stationary workpiece 600. Perpendicular geometric locking devices 402 and inline geometric locking devices 401 are adjusted toward stationary workpiece 600 via geometric interlocking bolt fasteners 403.

Drive-pressure mechanism 200, forming the active section of automated fusion bonding apparatus 10, is connected to passive fusion bonding mechanism 300, via twist lock projected extension geometry 236 found in drive-pressure mechanism lower external housing 210, which couples with mating passive fusion bonding mechanism external housing twist lock geometry 314. The system is then physically prepared to make the connection to plant air supply 100.

In initiating the friction welding fusion bonding operation, the operator first determines, by reference to a regulator pressure gauge (not shown), that desired plant air pressure and flow capability are insured. Preferably, filtered plant air supply 100 is connected to power source quick disconnect 137. Power source quick disconnect 137 permits the ease of connecting and disconnecting automated fusion bonding apparatus 10 to any standard plant air supply system. Filtered plant air from a flexible connection hose (not shown) enters automated fusion bonding apparatus 10 at a preferred air pressure of 80 to 125 PSIG via power source quick disconnect 137. Plant air entering via power source quick disconnect 137 is channeled through power source inlet port 138 to power source-control peripheral manifold 112, which provides for plant air movement to other areas of automated fusion bonding apparatus 10. With the introduction of air into power source-control peripheral manifold 112, air is simultaneously channeled to power source-control piston pressure-flow passages 102, control system pressure-flow impedance device 129, fusion completion triggering device 228, and stop valve 139.

Power source-control piston upper chamber 108 is pressurized by the introduction of air through power source-control piston pressure-flow passages 102. Power source-control piston upper chamber 108 is continually vented to the atmosphere. The pressure introduced to power source-control piston upper chamber 108 is approximately the same pressure regulated from plant air supply 100. Therefore, upon connection and energizing of plant air supply 100 after power source quick disconnect 137 is safely in place, there will immediately be a pressure differential force across power source-control piston 105 which causes power source-control piston 105 to move forward toward the lower distal end of automated fusion bonding apparatus 10. This causes power source-control piston valve seal 113 to automatically seat on power source-control piston valve seat 114, thus effectively blocking air flow to rotatable drive means 221. The aforementioned differential pressure force exists because of the greater pressure on an upper proximal end of power source-control piston 105, as compared to the pressure in power source-control lower piston chamber 110, which is approximately ambient pressure.

A pressure differential force also exists in the opposite direction, attempting to move power source-control piston 105 back toward the upper distal end of automated fusion bonding apparatus 10. This pressure differential exists because plant air supply 100 pressure contained in power source-control peripheral manifold 112, acting on a lower distal end of power source-control piston 105, is low compared to the pressure of power source-control lower piston chamber 110. However, since the areas on opposite sides of power source-control piston 105 are significantly different in pressure force reaction area, the overriding differential pressure force maintains the desired position of power source-control piston 105, as required for a particular operational mode.

Provisions can be made to assure that power source-control piston 105 starts off in a forward position toward the lower distal end of automated fusion bonding apparatus 10, when plant air supply 100 is not connected, by use of power source-control piston spring 122, which constantly applies a positive force on power source-control piston 105 toward the lower distal end of automated fusion bonding apparatus 10. This causes power source-control piston valve seal 113 to seat on power source-control piston valve seat 114, when plant supply air 100 is not connected to power source quick disconnect 137.

At the same time pressurized plant air supply 100 is introduced via power source quick disconnect 137, fusion completion triggering device 228 is energized by the introduction of air from power source-control peripheral manifold 112 to control system pressure-flow impedance device 129, and pressure-flow passage 227. Prior to fusion completion triggering device 228 being activated, signaling fusion completion, one way flow device 127 and pressure-flow passages 126, 226 are at a pressure level that is insufficient to cause power source-control piston 105 to move forward toward the lower distal end of automated fusion bonding apparatus 10 and cause power source-control piston valve seal 113 to seat on power source-control piston valve seat 114, even when air is flowing to rotatable drive means 221, after the operator commences the friction welding fusion bonding process.

Air flow speed through fusion completion triggering device 228 is in the range of high subsonic to supersonic. Air venting from fusion completion triggering device 228 flows into drive-pressure mechanism upper intermediate external housing vent chamber 207 when, prior to starting the system, its opening is maintained in a closed position. The pressure build-up in drive-pressure mechanism upper intermediate external housing vent chamber 207 causes a differential pressure force to exit from the lower distal end to the upper proximal end of automated fusion bonding apparatus 10 via drive-pressure mechanism upper intermediate external housing vent port 208 and drive-pressure mechanism upper internal piston housing 213. This pressure build-up causes drive-pressure mechanism upper internal piston housing 213 to move toward the upper proximal end of automated fusion bonding apparatus 10. The pressure build-up in drive-pressure mechanism upper intermediate external housing vent chamber 207 also causes feedback through pressure-flow passage 226 and one way flow device 127, and on to power source-control piston upper chamber 108, to assure that automated fusion bonding apparatus 10 will not start up.

Referring to FIG. 15, a non-start up safety feature of multiport valve 239 requires the operator to open multiport valve 239 before the system can start because of pressure build-up from fusion completion triggering device 228.

When multiport valve 239 is in its normally closed position, it permits secondary forging piston chamber 116 and primary forging piston chamber 212 to vent to the atmosphere, and pressurization of drive-pressure mechanism upper intermediate external housing vent chamber 207, so as to force drive-pressure mechanism upper internal piston housing 213 back toward the upper proximal end of automated fusion bonding apparatus 10. At this stage, primary forging piston chamber 212 is vented.

Also at the same time pressurized plant air is introduced via power source quick disconnect 137, control system pressure-flow impedance device 129 is energized via power source-control peripheral manifold 112. Plant air then flows through control system pressure-flow impedance device 129 and out to delay control device 120, which, in combination with pressure flow passage 119, provides for analog timing. Plant air leaving delay control device 120 flows to power source-control piston upper chamber 108 via pressure-flow passage 119. The plant air flow passing through control system pressure-flow impedance device 129 will have no affect on the operation of automated fusion bonding apparatus 10 until control system start valve 132 is activated, because the pressure in power source-control piston upper chamber 108 will, after the calculated time delay, equal the pressure in delay control device 120. One way flow valve 125 maintains pressure in power source-control piston upper chamber 108.

Delay control device 120 can be digital or analog, and also has the capability of overriding fusion completion triggering device 228. Volume chamber 241 delays the forging pressure rate of increase in secondary forging piston chamber 116, while permitting a more rapid increase in pressure flow in primary forging piston chamber 212, to provide for variable increasing axial force exerted on passive fusion bonding mechanism 300. Air is supplied to stop valve 139 at the time plant air is supplied to power source-control peripheral manifold 112, and can be activated any time after control system start valve 132 is depressed, to accomplish manual emergency shut-down of automated fusion bonding apparatus 10.

To start the friction welding fusion process, the operator depresses control system start valve 132, which releases the pressurized plant air from power source-control piston upper chamber 108. The venting of the air in power source-control piston upper chamber 108 causes the differential pressure force across power source-control piston 105 to reverse, and causes power source-control piston 105 to move toward the upper proximal end of automated fusion bonding apparatus 10. Power source-control piston valve seal 113 is then unseated from power source-control piston valve seat 114, thereby permitting plant air to flow through power source-control exit passage 115 to rotatable drive means 221, which starts the spinning of rotatable workpiece 500. Additionally, plant air from drive-pressure mechanism upper intermediate external housing exit passage 115 is fed to control system pressure-flow regulating device 140.

Again referring to FIG. 15, a programmable first timing means 152 provides a signal to release the forging pressure after a preset time delay is achieved by a programmable timer. A preset time delay occurs by setting pressure flow impedance device 142, which regulates fluid flow to volume pressure flow delay element 143, to one way flow device 144, on through pressure-flow passage 145, and finally to differential pressure relief valve 146, which releases the forging pressure.

A programmable second timing means 153 stops the circulation of fluid to drive-pressure mechanism 200 after a preset time delay is achieved by a programmable timer which, until a preset time delay occurs, releases forging pressure. A preset time delay occurs by setting control system pressure-flow impedance device 129, which regulates flow to delay control device 120, to one way flow device 127, on through pressure-flow passage 119, and finally to power source-control piston upper chamber 108, to provide a differential pressure across power source-control piston 105. When the preset time delay is reached, power source-control piston 105 moves toward power source-control piston valve seat 114.

A minimum automated fusion bonding apparatus 10 run time is achieved by a programmable third timing means 154, whereby all control systems are overridden until a preset time delay has occurred. A preset time delay occurs by setting pressure flow impedance device 147, which regulates fluid flow to volume pressure-flow delay element 148, to one way flow device 149, on through pressure flow passage 150, to differential pressure relief valve 243. Power source-control piston upper chamber 108 normally vents through pressure-flow passage 244 until the preset time delay is reached. Power source-control piston upper chamber 108 will not be pressurized by fusion completion triggering device 228 until the preset time delay is reached, at which time power source-control piston 105 is permitted to move toward power source-control piston valve seat 114.

All of the programmable timing means can be digital fluidic devices or fluid logic devices.

The plant air entering control system pressure-flow regulating device 140 flows through its primary forging piston chamber 212 and fluid flow passage 141. Control system pressure-flow regulating device 140 can be reprogrammed and adjusted at a preset flow rate, through fluid flow passage 141 and into primary forging piston chamber 212. Air continues to flow into upper forging pressure passage 232 and on to secondary forging piston chamber 116, through adjustable flow impedance device 240 and delay control device 120.

From the start of the fusion operation, after control system start valve 132 is activated, the forging pressure in primary forging piston chamber 212 and secondary forging piston chamber 116 continues to increase until these chamber volumes and passages are pressurized with plant air to the maximum regulated supply pressure, or until the fusion bonding process is stopped, either manually or automatically, by fusion completion triggering device 228. The increasing pressure in secondary forging piston chamber 116 and primary forging piston chamber 212 create high differential pressure forces and cause drive-pressure mechanism upper internal piston housing 213 and drive-pressure mechanism lower internal piston housing 224, which are bolted together, to move forward toward the lower distal end of automated fusion bonding apparatus 10 with sufficient force to complete the forging process.

Friction welding fusion bonding is achieved when rotatable workpiece 500, installed in passive fusion bonding mechanism power rotatable workpiece shaft 309, spinning at high speeds, is urged in an axial direction toward stationary workpiece 600 until the two materials rub together and generate heat sufficient to bring both rotatable workpiece 500 and stationary workpiece 600 meeting surfaces to a plastic state. The forging pressure is achieved by drive-pressure mechanism 200 applying axial force pressure on passive fusion bonding mechanism 300 and passive fusion bonding mechanism shaft-bearing housing 306. Passive fusion bonding mechanism power rotatable workpiece shaft 309 and rotatable workpiece 500 spin at high speed at the same time the axial force against stationary workpiece 600 increases, thus permitting the desired burn-off and upset to be achieved and, ultimately, the forging pressure sufficient to complete the fusion bond of the materials.

The fusion bonding process is completed when fusion completion triggering device 228 determines that fusion has been achieved at the programmed fusion upset area, as determined by preprogrammed conditions. However, the fusion bonding process can be terminated manually by the operator depressing stop valve 139 after control system start valve 132 has been activated. Additionally, the automatic preset time delay shutdown mechanism previously described and controlled by control system pressure-flow impedance device 129 will terminate the fusion bonding process at a preprogrammable time after control system start valve 132 has been activated. All three of the aforementioned modes of shutting down automated fusion bonding apparatus 10 are accomplished by the introduction of pressurized plant air into power source-control piston upper chamber 108, thus causing the differential pressure force across power source-control piston 105 to reverse and cause power source-control piston 105 to move toward the lower distal end of automated fusion bonding apparatus 10. This causes power source-control piston valve seal 113 to seat on power source-control piston valve seat 114 and blocks plant air flow through drive-pressure mechanism upper intermediate external housing exit passage 115, thus stopping rotatable drive means 221 from spinning rotatable workpiece 500.

The forging pressure will remain constant until such time as manually released by manual forging pressure relief valve 229, or automatically released by differential pressure relief valve 146, which releases the forging pressure in secondary forging piston chamber 116 and primary forging piston chamber 212.

Once the forging pressure is released, automated fusion bonding apparatus 10 can be removed from passive fusion bonding mechanism external housing 301. A spline configured tool (not shown) can then be inserted into spline coupling element 310 for despinning passive fusion bonding mechanism power rotatable workpiece shaft 309 from rotatable workpiece 500. A conventional automatic despinning system can be used (not shown). Passive fusion bonding mechanism 300 can then be removed from stationary workpiece clamping mechanism 400 by removing bolts from clamping mechanism installation threads 305 or releasing a twist lock connection.

From the foregoing description those skilled in the art will appreciate that all of the objects of the present invention are realized. A portable automated fusion bonding apparatus for welding and bonding materials together has been shown and described which can be utilized in industrial settings and in the field.

While specific embodiments have been shown and described, many variations are possible. The device can be manufactured in different sizes by scaling the design up or down, depending on the size range of the fittings to be welded and installed. The apparatus can be manufactured of various materials which exhibit desirable operating characteristics, such as light weight, durable metals or plastics. A digital fluidic device timing means may provide the timing function. Various power sources may be used, such as electrical, hydraulic, and hybrids.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of the invention be determined by the appended claims and their equivalents.

What is claimed is:

1. A method of fusion bonding a rotatable workpiece to a stationary workpiece comprising the steps of:

providing an integrated drive-pressure mechanism;

providing a passive fusion bonding mechanism comprising an external housing, said passive fusion bonding mechanism coupled to said drive-pressure mechanism;

providing a support assembly comprising a clamping mechanism;

securing said stationary workpiece to said clamping mechanism in a fixed, non-rotating relationship relative to said rotatable workpiece;

securing said rotatable workpiece to said passive fusion bonding mechanism;

placing said rotatable workpiece in a contacting pressure relationship relative to said stationary workpiece;

maintaining said rotatable workpiece and said stationary workpiece in a relative axial orientation;

providing a source of pressurized fluid energy to said drive-pressure mechanism;

rotating said rotatable workpiece relative to said stationary workpiece, thereby inducing a burn-off phase and an upset phase;

increasing the axial contacting force between said rotatable workpiece and said stationary workpiece to a maximum pressure permitted by a fluid supply source pressure;

completing the fusion bonding process, thereby terminating rotation of said rotatable workpiece relative to said stationary workpiece;

maintaining the axial contacting force between said rotatable workpiece and said stationary workpiece at a rotation termination pressure, until released either manually or automatically after a forging cool-down time sufficient to fuse said rotatable workpiece to said stationary workpiece; and removing said drive-pressure mechanism from said passive fusion bonding mechanism, thereby permitting removal of said clamping mechanism.

2. The method of claim 1, wherein said rotating step and said increasing axial contacting force step are accomplished by means of a programmable control system.

3. The method of claim 1, wherein said rotating step further comprises rotating said rotatable workpiece at a preprogrammable selected speed relative to said stationary workpiece.

4. The method of claim 1, further comprising the step of establishing a detachable encapsulation chamber around an area with a pliable gasket seal between said detachable encapsulation chamber and said stationary workpiece at the point of contact between said rotatable workpiece and said stationary workpiece, said detachable encapsulated weld enclosure comprising a chamber formed around said rotatable workpiece.

5. The method of claim 4, further comprising the step of providing a pressure in said encapsulation chamber.

6. The method of claim 4, wherein said rotating step further comprises simultaneously maintaining positive fluid pressure within said chamber.

7. The method of claim 1, wherein said rotatable workpiece is maintained in an axial, contacting relationship relative to said stationary workpiece by said clamping mechanism, said clamping mechanism comprising means for adjustably maintaining said stationary workpiece in a selected position relative to said rotatable workpiece.

8. The method of claim 7, wherein said clamping mechanism further comprises:

a bracket of sufficient length to surround said stationary workpiece, said bracket connected to said passive fusion bonding mechanism external housing; and a plurality of locking devices connected to said bracket.

9. The method of claim 8, wherein said bracket is connected to said passive fusion bonding mechanism external housing in a twist-locked fashion.

10. A programmable control system for controlling an automated fusion bonding apparatus, wherein said automated fusion bonding apparatus comprises a drive-pressure mechanism, a drive-pressure mechanism external housing and two or more forging piston chambers, said drive-pressure mechanism slidably engaged to a passive fusion bonding mechanism which holds a rotatable workpiece, said drive-pressure mechanism causing said passive fusion bonding mechanism to rotate and move forward in an axial direction toward a stationary workpiece, so as to induce burn-off, upset, forging and fusion phases to produce a fusion weld between said workpieces, said programmable control system comprising:

a quick disconnect assembly through which plant air flows to said automated fusion bonding apparatus, said quick disconnect assembly releasably coupled to said drive-pressure mechanism external housing;

a power source-control valve disposed within said drive-pressure mechanism external housing to turn on and shut off flow of said plant air;

a plurality of pressure-flow passages disposed within said drive-pressure mechanism external housing through which said plant air flows to a rotatable drive means, said forging piston chambers, said drive-pressure mechanism external housing, and the atmosphere as exhaust;

a start valve connected to said drive-pressure mechanism external housing which starts circulation of said plant air to said programmable system;

a stop valve connected to said drive-pressure mechanism external housing which stops circulation of said plant air to said programmable system;

a forging pressure relief valve disposed within said drive-pressure mechanism external housing;

diagnostic ports disposed within said drive-pressure mechanism external housing which measure pressure throughout said programmable control system;

a programmable regulator means disposed within said drive-pressure mechanism external housing which provides pressure to said piston chambers;

a programmable fusion completion triggering means disposed within said drive-pressure mechanism external housing which programs a desired position of said rotatable workpiece and measures said position in a fixed relationship with said stationary workpiece and stops circulation of said plant air to said drive-pressure mechanism when said position is reached;

a programmable first timing means disposed within said drive-pressure mechanism external housing, said programmable first timing means releasing a forging pressure from said piston chambers after a preprogrammable time delay after said apparatus is shut down;

a programmable second timing means disposed within said drive-pressure mechanism external housing, wherein said programmable second timing means overrides said programmable control system to shut down said apparatus after a preprogrammed time period;

a programmable third timing means disposed within said drive-pressure mechanism external housing, wherein said programmable third timing means overrides said programmable control system to provide for a predetermined fusion operational period after said start valve has been depressed;

a multiport valve disposed within said drive-pressure mechanism external housing which overrides said start valve and said programmable control system;

a programmable governor means disposed within said drive-pressure mechanism which permits selection of a preprogrammable operation speed of said rotatable drive means; and a programmable time delay means disposed within said drive-pressure mechanism external housing which delays a forging pressure rate of increase in one of said forging piston chambers while permitting a more rapid increase in pressure flow in said other forging piston chamber.

11. The programmable control system of claim 10, wherein said plant air is pressurized and is supplied to said programmable control system through a pressure flow line releasably coupled to said rotatable drive means.

12. The programmable control system of claim 10, wherein said programmable first timing means, said programmable second timing means or said programmable third timing means are digital fluidic devices.

13. The programmable control system of claim 10, wherein said programmable first timing means, said programmable second timing means or said programmable third timing means are analog fluid logic devices.

14. A portable welding apparatus for fusion bonding a rotatable workpiece to a stationary workpiece, wherein the fusion bonding process includes burn-off, upset, forging and fusion phases, said apparatus comprising:

a programmable control system for controlling the operation of said apparatus comprising control flow passages and control elements;

means for rotating said rotatable workpiece against said stationary workpiece;

an integrated drive-pressure mechanism, in which said means for rotating is disposed, said drive-pressure mechanism imparting a variable axial pressure between said workpieces for an adjustable time period, thereby inducing said phases to create a fusion weld between said workpieces;

a drive-pressure mechanism external housing, said control system disposed within said drive-pressure mechanism external housing;

a drive-pressure mechanism internal piston housing disposed within the lower part of said drive-pressure mechanism external housing;

a passive fusion bonding mechanism slidably coupled to said drive-pressure mechanism external housing and said drive-pressure mechanism internal piston housing, comprising a passive fusion bonding mechanism internal shaft bearing housing, a shaft for holding a rotatable fitting, said shaft disposed within said passive fusion bonding mechanism internal housing, and bearings attached to said shaft;

a fluid supply system comprising a plurality of pressure-flow passages operably connected to said drive-pressure mechanism external housing, said fluid supply system conveying fluid to said drive-pressure mechanism to circulate pressurized fluid to and from said means for rotating, said drive-pressure mechanism and said control system;

a power source-control piston valve in said drive-pressure mechanism external housing;

an upper pressurization chamber connected to said control flow passages and said power source-control piston valve;

a start valve connected to said drive-pressure mechanism external housing for selectively starting circulation of said pressurized fluid to said apparatus;

a stop valve connected to said drive-pressure mechanism external housing for selectively stopping circulation of said pressurized fluid to said apparatus to stop rotatable motion; and a regulating device connected to said drive-pressure mechanism external housing for selectively regulating the circulation of said pressurized fluid.

15. The apparatus of claim 14, wherein said variable axial pressure between said workpieces is increasing.

16. The apparatus of claim 14, further comprising a support means removeably engageable to said passive fusion bonding mechanism external housing and adapted to hold said stationary workpiece in a fixed axial relationship relative to said rotatable workpiece.

17. The apparatus of claim 14, wherein said fluid supply system comprises a source of pressurized air, said pressurized air supplied directly through a main air supply within said drive-pressure mechanism external housing.

18. The apparatus of claim 14, further comprising a programmable first timing means disposed within said drive-pressure mechanism external housing, said programmable first timing means releasing a forging pressure from said pressurized chambers after a preprogrammable time delay after said apparatus is shut down.

19. The apparatus of claim 14, further comprising a programmable second timing means disposed within said drive-pressure mechanism external housing, wherein said programmable second timing means overrides said control system to shut down said apparatus after a preprogrammed time period.

20. The apparatus of claim 14, further comprising a programmable third timing means disposed within said drive-pressure mechanism external housing, wherein said programmable third timing means overrides said control system to provide for a predetermined fusion operational period after said start valve has been depressed.

21. The apparatus of claim 14, further comprising a preprogrammable fusion completion triggering device disposed within said drive-pressure mechanism external housing.

22. The apparatus of claim 21, wherein air flow speed through said fusion completion triggering device is in the range of high subsonic to supersonic.

23. The apparatus of claim 21, wherein said fusion completion triggering device sends a pressure signal to a predetermined position relative to said drive-pressure mechanism internal housing.

24. The apparatus of claim 21, further comprising a fusion completion triggering device shaft and a threaded portion and wherein said fusion completion triggering device is adjustable by being rotated along said threaded portion.

25. A portable friction welding apparatus for fusion bonding a rotatable workpiece to a stationary workpiece, wherein the fusion bonding process comprises burn-off, upset, forging and fusion phases, said apparatus comprising:

an integrated drive-pressure mechanism, comprising a drive-pressure mechanism external housing, a drive-pressure mechanism internal piston housing, a rotatable drive means and a rotatable drive means shaft in said drive-pressure mechanism internal piston housing, said drive-pressure mechanism internal piston housing slidably and axially disposed within said drive-pressure mechanism external housing so that a selected axial force is produced;

a passive fusion bonding mechanism slidably coupled to said integrated drive-pressure mechanism, said passive fusion bonding mechanism comprising a passive fusion bonding mechanism external housing, a passive fusion bonding mechanism internal shaft-bearing housing, and a passive fusion bonding mechanism shaft, said passive fusion bonding mechanism internal shaft bearing housing slidably disposed in said passive fusion bonding mechanism external housing, said passive fusion bonding mechanism shaft slidably coupled to said rotatable drive means shaft, wherein said passive fusion bonding mechanism shaft holds said rotatable workpiece within said passive fusion bonding mechanism external housing and said passive fusion bonding mechanism shaft rotates said rotatable workpiece in an axial direction toward said stationary workpiece, and further wherein said passive fusion bonding mechanism shaft concurrently translates rotational motion to said rotatable workpiece for said phases;

an engagement mechanism coupled to said drive-pressure mechanism and said passive fusion bonding mechanism to translate rotatable motion and axial movement forces to said passive fusion bonding mechanism shaft, thereby rotating said rotatable workpiece toward said stationary workpiece for said phases; and a control system for controlling said fusion bonding process.

26. A method of fusion bonding a rotatable workpiece to a stationary workpiece, said method comprising utilizing the apparatus of claim 25.

27. The apparatus of claim 25, wherein said control system is programmable.

28. The apparatus of claim 25, wherein said engagement means comprises a spline coupled to said passive fusion bonding mechanism shaft.

29. The apparatus of claim 25, wherein said control system is operably engaged to a power source-control piston valve means slidably disposed within said drive-pressure mechanism external housing, wherein said power source control piston valve means supplies fluid flow to said drive-pressure mechanism.

30. The apparatus of claim 25, further comprising one or more fluid pressure monitoring ports operatively disposed within said drive-pressure mechanism external housing.

31. The apparatus of claim 25, wherein said rotatable workpiece comprises an attachment end, an upset shaft and a fusion area.

32. The apparatus of claim 25, wherein said drive-pressure mechanism internal piston housing comprises an internal anti-rotational means.

33. The apparatus of claim 25, wherein said drive-pressure mechanism internal piston housing further comprises a programmable rotational speed means.

34. The apparatus of claim 23, wherein said programmable rotational speed means is selected from the group consisting of a mechanical adjustable governor, a pneumatic adjustable governor and a pneumatic flow limiting governor.

35. The apparatus of claim 25, wherein said drive-pressure mechanism internal piston housing comprises an urging plate disposed within said drive-pressure mechanism internal piston housing.

36. The apparatus of claim 35, wherein said drive-pressure mechanism is coupled to said passive fusion bonding mechanism in a twist-locked fashion with locking pins and said rotatable drive means causes said passive fusion bonding mechanism shaft to rotate said rotatable workpiece as said rotatable workpiece is urged forward toward said stationary workpiece, and said urging plate forces said passive fusion bonding mechanism internal shaft bearing housing toward said stationary workpiece for the fusion bonding process.

37. The apparatus of claim 25, wherein said drive-pressure mechanism external housing is axially and slidably coupled to said passive fusion bonding mechanism external housing by a quick disconnect assembly.

38. The apparatus of claim 37, further comprising a shaft coupling element, said shaft coupling element having two ends, wherein one of said ends is threadedly coupled to said passive fusion bonding mechanism shaft and the other of said ends is slidably coupled to said rotatable drive means shaft.

39. The apparatus of claim 25, wherein said passive fusion bonding mechanism further comprises a detachable encapsulation chamber, said detachable encapsulation chamber disposed about the terminal end of said passive fusion bonding mechanism external housing and said rotatable workpiece, said apparatus further comprising means for maintaining a positive pressure in said detachable encapsulation chamber during the fusion weld process.

40. The apparatus of claim 39, wherein said detachable encapsulation chamber further comprises a pliable gasket placed in spaced relation between said passive fusion bonding mechanism external housing and said stationary workpiece.

41. The apparatus of claim 25, further comprising a support means removeably engageable to said passive fusion bonding mechanism external housing and adapted to hold said stationary workpiece in a fixed axial relationship relative to said rotatable workpiece.

42. The apparatus of claim 41, wherein said support means comprises:
a workpiece clamping bracket releasably coupled to said passive fusion bonding mechanism external housing;
a plurality of threaded fasteners attached to said workpiece clamping bracket; and
one or more adjustable arms which float on said threaded fasteners, said one or more arms comprising a plurality of independent linear and perpendicular geometrically shaped moveable attachment elements to position said stationary workpiece in a fixed, spaced relationship relative to said rotatable workpiece.

43. The apparatus of claim 42, wherein said workpiece clamping bracket is releasably coupled to said passive fusion bonding mechanism by a twist-locking means.

44. The apparatus of claim 25, wherein said drive-pressure mechanism external housing further comprises one or more pressurizable chambers defined within said drive-pressure mechanism external housing, wherein said pressurizable chambers are in fluid communication with a source of pressurized fluid.

45. The apparatus of claim 44, further comprising pressure seals disposed externally on said drive-pressure mechanism internal piston housing to prevent fluid pressure from escaping said drive-pressure mechanism pressurizable chambers during said forging phase.

46. The apparatus of claim 44, wherein said drive-pressure mechanism internal piston housing is slidably and axially disposed within said drive-pressure mechanism external housing, and further wherein introduction of fluid in said pressurizable chambers results in axial movement of said drive-pressure mechanism internal piston housing, thereby driving said drive-pressure mechanism internal piston housing toward said passive fusion bonding mechanism internal shaft bearing housing at a preprogrammable selected axial force level.

47. The apparatus of claim 46, wherein said preprogrammable selected axial force level is increasing.

* * * * *